United States Patent
Akgun et al.

(10) Patent No.: US 7,145,887 B1
(45) Date of Patent: Dec. 5, 2006

(54) COMMUNICATION OF PACKET ARRIVAL TIMES TO CABLE MODEM TERMINATION SYSTEM AND USES THEREOF

(75) Inventors: Ali Akgun, Chicago, IL (US); Mark O. Vogel, Hampshire, IL (US); Christopher J. Rozman, Kildeer, IL (US)

(73) Assignee: 3Com Corporation, Marlborough, MA (US)

( * ) Notice: Subject to any disclaimer, the term of this patent is extended or adjusted under 35 U.S.C. 154(b) by 1341 days.

(21) Appl. No.: 09/899,365

(22) Filed: Jul. 2, 2001

Related U.S. Application Data

(63) Continuation-in-part of application No. 09/792,366, filed on Feb. 23, 2001.

(51) Int. Cl.
*H04B 7/212* (2006.01)
*H04J 3/06* (2006.01)

(52) U.S. Cl. .................... 370/321; 370/443; 370/516
(58) Field of Classification Search .............. None
See application file for complete search history.

(56) References Cited

U.S. PATENT DOCUMENTS

| | | | |
|---|---|---|---|
| 6,507,592 B1 * | 1/2003 | Hurvig et al. | 370/503 |
| 6,657,983 B1 * | 12/2003 | Surazski et al. | 370/337 |
| 6,698,022 B1 * | 2/2004 | Wu | 725/111 |
| 6,950,399 B1 * | 9/2005 | Bushmitch et al. | 370/236 |
| 7,024,680 B1 * | 4/2006 | Howard | 725/107 |

OTHER PUBLICATIONS

Data-Over-Cable Service Interface Specifications ("DOCSIS"), Radio Frequency Interface Specification, SP-RFI-I04-980724, Interim Specification, Cable Television Laboratories, Inc. dated Jul. 24, 1998.

* cited by examiner

*Primary Examiner*—Chau Nguyen
*Assistant Examiner*—Cynthia L. Davis
(74) *Attorney, Agent, or Firm*—McDonnell Boehnen Hulbert & Berghoff LLP

(57) ABSTRACT

A cable modem communicates the timing of the arrival of certain packets (such as TCP ACK packets) to a cable modem termination system. This timing feature is useful in methods for increasing the throughput in the downstream direction by eliminating TCP ACKs backing up at a cable modem. In particular, a cable modem termination system implementing an unsolicited bandwidth grant service in which unsolicited grants of bandwidth are sent by the cable modem termination system to the cable modem. The grants of bandwidth are timed to arrive at the cable modem simultaneously with or shortly after the arrival of the TCP ACK from an end station connected to the cable modem. Several methods of calculating or predicting when the unsolicited grants should be sent to the cable modem are described. The method is also applicable to other types of packets, such as voice packets from a end station implementing a Voice over Internet Protocol (VoIP) application.

24 Claims, 8 Drawing Sheets

LATENCY = 0 DUE TO SHIFT IN NOMINAL GRANT INTERVAL BY $\Delta t = t_{i+1} - t_i$

▨ UNSOLICITED DATA GRANT, 302
▤ PACKETS CONTAINING G.711 VOICE SAMPLES, 320

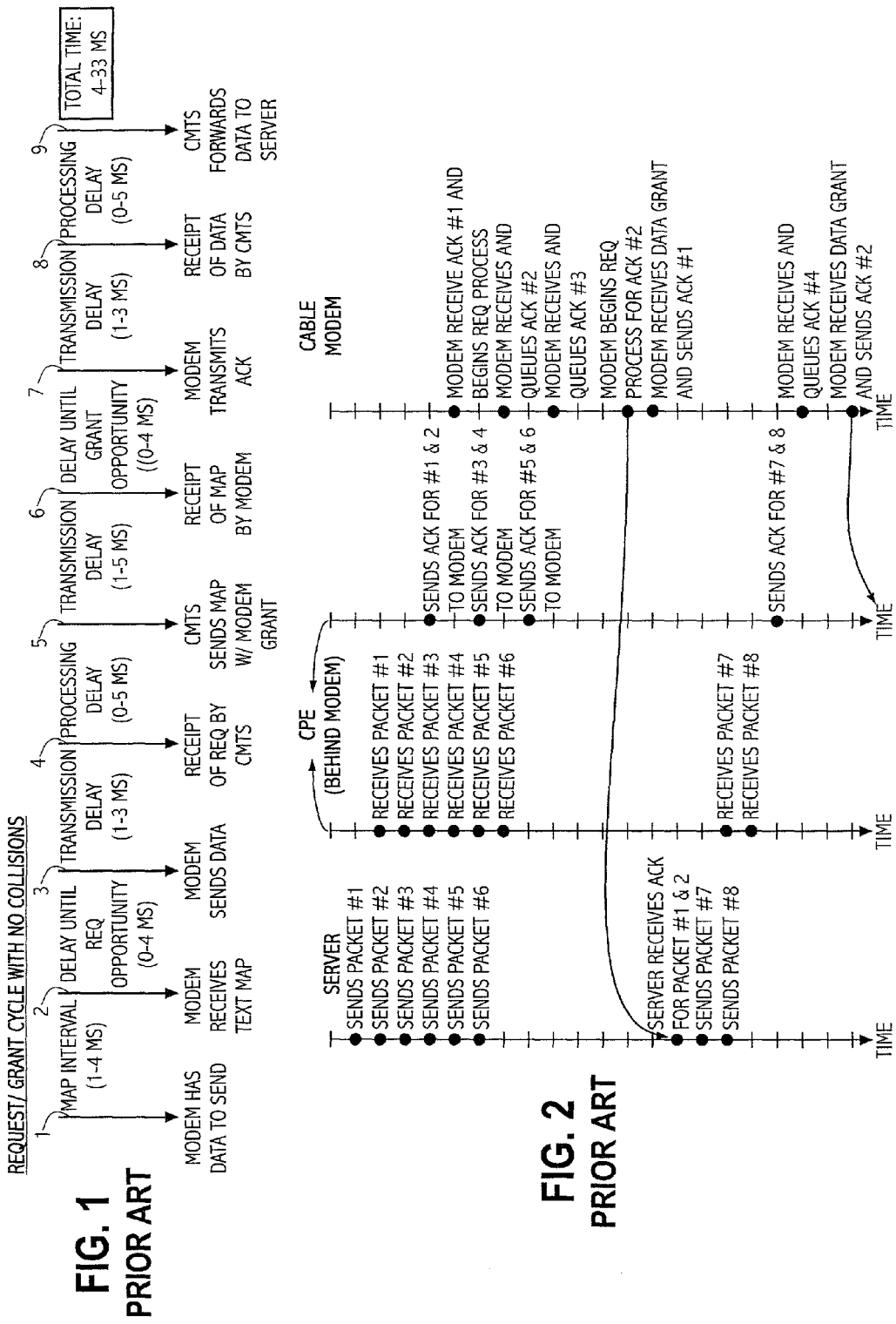

COMMUNICATION OF PACKET ARRIVAL TIMES TO CABLE MODEM TERMINATION SYSTEM AND USES THEREOF

CROSS-REFERENCE TO RELATED APPLICATION

This is a continuation in part of prior application Ser. No. 09/792,366 filed Feb. 23, 2001, the contents of which are incorporated by reference herein.

BACKGROUND OF THE INVENTION

A. Field of the Invention

This invention relates to the field of data communication and data-over-cable systems compliant to the Data-Over-Cable Service Interface Specification (DOCSIS) standard. More particularly, the invention relates to a method of reducing delay in a cable system. The method involves communicating packet arrival times or measurements of latency between grants of bandwidth and packet arrival times at the cable modem to a cable modem termination system, which responsively adjusts the timing of grants of bandwidth.

The invention will be described in several contexts, one of which is a method for granting upstream channel bandwidth to cable modems for transmission of Transmission Control Protocol (TCP) acknowledgments. The method of the invention improves the performance or throughput of TCP connections between the cable modems and a Cable Modem Termination System (CMTS).

B. Description of Related Art

With the explosive growth of the Internet, many customers have desired to use the larger bandwidth of a cable television network to connect to the Internet and other computer networks. Cable modems, such as those provided by 3Com Corporation of Santa Clara, Calif., and others offer customers higher-speed connectivity to the Internet, an intranet, local area networks ("LANs"), and other computer networks via cable television networks. These cable modems currently support a data connection to the Internet and other computer networks via a cable television network with a data rate of up to 30+ Mbps, which is a much larger data rate than can be supported by a modem used over a standard telephone line.

Data-over-cable systems may serve many cable modems simultaneously. A cable modem receives and transmits data in the form of digitally encoded radio frequency transmissions, which typically travel to and from the cable modem on, for example, coaxial cable. Also, the data-over-cable system consists of many branches from a common trunk, each branch serving a distinct group of cable modems, and the branches themselves may further divide into sub-branches. Thus the propagation of radio frequency signals to and from the cable modem often follows a circuitous and convoluted path. Transmissions from the cable modem are terminated in a cable system head-end by a device known as a Cable Modem Termination System or CMTS.

Background information related to cable modem systems in general is described in the Data-Over-Cable Service Interface Specifications ("DOCSIS")—Radio Frequency Interface Specifications, issued by Cable Television Laboratories, Inc. This document, known to persons working in the art, is incorporated by reference herein in its entirety. The DOCSIS standard specifies a collection of layers of communication protocols to be used in cable networks. These specifications are commonly referred to as "the DOCSIS standard". The DOCSIS standard is comprised of several specifications, among them, the RFI specification referred to above which describes the Radio Frequency Interface, in other words the operations of the Physical, Sub-Convergence, Media Access Control, Network and Application layers inside the Cable Network.

The cable network offers customers higher-speed connectivity to the Internet and other computer networks via a cable modem. The cable modem is an interface between an end-station and the cable network. The end-station or the terminal is a device on the cable network, for example a personal computer, which communicates over the cable network. The cable modem enables the station to send and receive data from the cable network. As multiple cable modems may reside on the same coaxial cable, each contends for a share of the available bandwidth. Therefore, the cable television network is a shared access medium.

In the cable television network, transmissions originating from cable modems, referred to as "upstream traffic", and transmissions directed to cable modems, referred to as "downstream traffic", are carried on different frequencies. In the downstream direction, the data is transmitted through the shared medium. Medium Access Control (MAC) layer addressing ensures that the data is picked up and received by its intended target station. In the upstream direction, the CMTS divides time into regions, and communicates these regions to the cable modems by means of "MAP" messages transmitted on the downstream. The process of allocating portions of the upstream bandwidth to specific cable modems, so that they may transmit data on the upstream is commonly referred to as "Scheduling". The DOCSIS standard provides several methods of scheduling:

1.) Best Effort Service

A cable modem wishing to transmit data on the upstream transmits data requests to the CMTS, in what are called contention regions. The CMTS transmits data grants to the cable modems, and the cable modems use the regions allocated to them in the data grants, to transmit their data.

2.) Unsolicited Grant Service (UGS)

During the initialization and registration of the cable modem, the CMTS establishes UGS service to that modem by periodically transmitting data grants to that specific modem. The grants are transmitted whether the modem uses them to transmit data or not.

3.) Unsolicited Grant Service with Activity Detection (UGS-AD)

Very similar to the UGS service, UGS-AD scheduling service waits for the cable modem to request a data grant. The CMTS then grants the requested data grant, and immediately starts a UGS service to the cable modem. When the CMTS detects that the cable modem is no longer using the data grants that it is being sent, the CMTS stops the UGS service.

4.) Real-Time Polling Service (RTPS)

Normally, in every MAP message, the CMTS schedules contention regions. These regions are open for every cable modem, and those cable modems which wish to transmit data, use these regions to transmit their requests. As the name implies, however, these are contention regions and more than one cable modem may transmit during this period. In that case, the CMTS will not hear the request, and therefore does not send data grants to the cable modems. When the cable modems detect the time-out for the data grant, they randomly back-off and use a different contention region to re-transmit their requests. It is, however, possible for the CMTS to transmit a unicast request region to a specific cable modem. This region takes up much less bandwidth than sending Unsolicited Grant Service, and therefore is more bandwidth efficient. The practice of scheduling periodic unicast request regions for specific modems is called "Real Time Polling" service.

5.) Non-real-time Polling Service(nRTPS)

This service is very similar to the RTPS service, except that the periodicity of the unicast requests in the nRTPS is much less stringent than the RTPS.

TCP

Cable modems compliant with the DOCSIS standard use TCP, or Transmission Control Protocol. TCP is a part of the Internet standard protocol suite generally referred to as the "TCP/IP" standard. It is fully defined in the IETF standards document RFC793, part of STD0007, incorporated by reference herein.

TCP is a transport layer protocol. It is also a connection oriented protocol. In other words, when TCP is employed as the transport layer of a transmission, the two hosts exchanging data first establish a connection. During the establishment of the connection, and later on as well, the two hosts exchange configuration data in order to most efficiently utilize the connection between them. After this, the hosts start exchanging data. At the end, the two hosts go through an explicit disconnect handshake, in order to tear down the TCP connection between them. During the transfer of data, TCP aims to guarantee delivery of the data packets from one host to the other. Towards this purpose, the host that receives the packet acknowledges the packet's reception to the host which sent the packet. The host sending the packet keeps track of the acknowledgments (ACKs) it is receiving and if it detects that there are one or more packets which were not acknowledged by the receiving host, the sending host retransmits these packets. Thus, TCP guarantees zero packet loss during the data exchange. Depending on the implementation, TCP hosts may ACK every packet they receive, they may ACK every other packet they receive or they may employ other ACK strategies.

TCP employs the concept of a flow control window. This window determines the number of bytes that the sending host may transmit to the receiving host before the sending host needs to pause and wait for an acknowledgment. In other words, this window determines the number of unacknowledged bytes that may be outstanding at any one time. If that number is reached, transmission must pause until one or more packets are acknowledged by the receiving host.

The flow control model that is used by TCP is a dynamic one, such that the size of the window is increased and decreased in response to the source's perception of the performance of the sink and the performance of the network. At the beginning of a connection, TCP goes through the slow-start phase, with a small window size. The window size is increased as ACKs are received from the sink (destination). At the beginning, the window size is increased exponentially, until the window size reaches a size referred to a "ssthresh" (slow start threshold), after which, the window size is increased linearly. During the exponential period, every ACK received from the sink doubles the window size, whereas during the linear period, every ACK received from the sink increases the window size by the inverse of the current window size ($1/\lfloor w \rfloor$). TCP will decrease its window size when it detects loss of ACKs. Of the two widely used versions of TCP, TCP-Tahoe detects missing ACKs via timeouts, and reacts to this situation by setting the flow control window back to 1, halving the value of ssthresh and re-entering the exponential phase of the flow management.

TCP-Reno, on the other hand, detects missing ACKs via timeouts and duplicate ACKs. If missing ACKs are detected via a timeout, TCP-Reno behaves identical to TCP-Tahoe, however, when duplicate ACKs are detected (three, to be more precise), TCP-Reno halves the ssthresh and the current flow control window, which results in the TCP connection going into the linear phase of the flow control management scheme.

Thus, from the above discussion, it will be apparent that the throughput of a TCP session in an asymmetric system, as is typical with cable modem Internet connections, is largely dependent on the slower of the two links, both during "healthy" bulk transfer and during recovery from loss. We also note that data-over-cable systems, while less so than wireless systems, are quite prone to loss in the upstream because of noise in the HFC plant. The throughput of a TCP connection depends not only on how fast the sending host can transmit data to the receiving host, but also on how fast the receiving host acknowledges back to the sending host.

During a TCP session, at the point when the flow control window is opened to its maximum size, the throughput of the system cannot exceed w/RTT packets/sec, where RTT is the Round Trip Time of the system. See S. Keshav, "An Engineering Approach to Computer Networking: ATM Networks, the Internet and the Telephone Network", Addison Wesley Publishing Co., July 1997. Intuitively, we can conclude that decreasing the round trip time will have a direct effect on the throughput of a TCP connection, even if the decrease is gained on that half of the connection which only carries the ACKs.

As described in T. V. Lakshman et al., "Performance Analysis of Window-Based Flow Control Using TCP/IP: The Effect of High Bandwidth-Delay Products and Random Loss", IFIP Transactions C-26, High Performance Networking V, North-Holland 1994 pp. 135–150, the throughput of a TCP connection will decrease in proportion to $p(R\mu)^2$, with p being the probability of packet loss and $R\mu$ the bandwidth-delay product. The two components of $R\mu$ are R, the round-trip time in seconds and $\mu$, the bottleneck service rate along the path. In a DOCSIS system, $\mu$ will be the speed of upstream link, or the speed of the link between the cable modem and the end-station, whichever is the slowest.

In accordance with the present invention, we describe one method to decrease the round trip time R, by decreasing the delay on the upstream link between the cable modem and the CMTS. In addition to improving the throughput of the system, this decrease will also lessen the impact of packet loss on the performance of TCP, by increasing the speed with which the TCP connection recovers back to the larger window sizes. It will be noted that that this improvement will be proportional to the square of the decrease we gain in the round trip time, in other words the improvement will be proportional to $R^2$. One principal aspect of how this improvement is achieved is provided by the inventive method of communication of TCP ACK packet arrival times at the cable modem to the cable modem termination system There are a number of existing methods proposed to alleviate the effects of a slow ACK path in a TCP connection.

1.) ACK Spoofing: TCP ACK spoofing entails the transmission of TCP ACKs by a network entity other than the station that is receiving the data which the ACKs are for. This is a method that has been used in deployed products by several vendors, although most of the time it is used in products that connect one station to another, in other words point-to-point connections. The reason for this is that TCP ACK spoofing requires the spoofing host to keep track of the TCP connection that it is providing ACKs for, firstly so as to know when and which packets require an ACK, but also so that when the station which is the receiver for the data, needs a re-transmission and therefore sends an ACK with a sequence number indicating the request for a re-transmission, the spoofing entity can realize the request, and send the appropriate ACK to facilitate the re-transmission. Hence, TCP ACK spoofing gets incredibly complex and memory intensive as the potential number of simultaneous TCP connections increases. Thus, it is not a very suitable method for a cable network with thousands of subscribers.

2.) ACK Filtering (Collapsing ACKs): Since TCP ACKs are cumulative, it is possible to filter out ACKs without harming a TCP connection. However, the filtering entity needs to be intelligent so as to not starve the source. This method can be applied at the sink itself, however it requires modification to the TCP stack at the network layer, or it could be done at a driver layer in which case the driver would have to be intelligent about multiple simultaneous connections. ACK Filtering could also be implemented at the cable modem, which then would have to be aware of the individual TCP connections going through it. See the Keshav reference cited above.

3.) Congestion Window Based Schemes: These schemes employ methods for the sink to increase/decrease the number of ACKs it transmits depending on the past, current or estimated size of the congestion window parameter Cwnd. These methods require modifications to the protocol stack on the source, the sink, or both, and thus is a less attractive solution.

4.) Header Compression: Header compression certainly helps in reducing the bandwidth required by transmissions on the upstream. Within the DOCSIS standard, it does not, however, help reduce the delay incurred by the ACK packets, since the cable modem still has to go through the request-grant process in order to secure bandwidth (albeit less bandwidth) for the packet. See V. Jacobsen, "Compressing TCP/IP Headers for Low-Speed Serial Links", IETF RFC 1144, February 1990.

Furthermore, DOCSIS provides a method which relates to this issue, known as concatenation. Concatenation allows the cable modem to concatenate several smaller packets into one large packet at the cable modem, and request bandwidth for and transmit only the single, larger packet. While this method definitely helps alleviate upstream congestion at the cable modem, it only takes effect after the fact. In terms of the present discussion, concatenation would take effect only after several ACKs had piled up at the cable modem. In other words, concatenation does not help reduce the delay which a single ACK packet incurs in the upstream direction.

The asymmetric nature of the DOCSIS standard also affects latency and delay for TCP connections. As was explained above, the upstream transmissions from the cable modem to the CMTS and the downstream transmissions from the CMTS to the cable modem are carried out on two different frequencies. Although the two different frequencies are carried on the same piece of coaxial cable at the termination point at the cable modem, because they are carried in two separate frequencies, the transmissions are physically isolated and employ different modulation types, resulting in distinct characteristics with regards to bandwidth and delay.

Insofar as bandwidth is concerned, the physical layer characteristics of upstream and downstream transmissions vary greatly in the DOCSIS standard. So do the data link layer characteristics, especially in the MAC sublayer. At the physical layer, upstream transmissions are modulated as QPSK or QAM16 signals, whereas the downstream transmissions are modulated as QAM64 or QAM256 signals. Whereas QPSK and QAM16 modulation methods achieve maximum bit rates of roughly 2.5 megabits per second (Mbps) and 10 Mbps respectively, QAM64 and QAM256 modulation methods achieve bit rates of 28 Mbps and 39 Mbps respectively.

Insofar as delay is concerned, the interleaver at the CMTS adds latency (delay) to the transmission of packets. Depending on the combination of interleaver and modulation type, this latency varies from 140 microseconds (usec) to 4.0 milliseconds (msec). In the upstream direction, the symbol rate used in the modulation of the signal, introduces different amounts of latency (delay) to the reception of the packet by the CMTS as well. Both directions also have a transmission delay due to the transmission media of up to about 1 ms.

The significant portion of the delay in a DOCSIS system, however, is introduced by the DOCSIS MAC layer mechanism for the upstream link. A cable modem wishing to transmit data on the upstream needs to go through a request-grant sequence. The requests for bandwidth are generally transmitted in contention regions and may collide with requests from other cable modems. However, since transmissions from one cable modem cannot be heard by another, a cable modem cannot listen on the line in Ethernet fashion. Rather it detects request collisions by inferring that the CMTS has not heard its request. Such a collision in a DOCSIS system results in significant delays. After the CMTS hears the request, it schedules bandwidth for the cable modem at a time in the future—this delay is determined by taking current time and adding to it the latency internal to the CMTS, the latency on the wire (propagation delay) and the latency in the cable modem. A cable modem which has secured bandwidth from the CMTS, and which also needs to request more bandwidth, can do so by "piggybacking" the request onto the data packet. This action eliminates the collision-prone request, but the CMTS still has to grant the modem bandwidth for the second packet.

An example will illustrate the various TCP and MAC aspects of delay. Consider the transmission of a single data packet from an File Transfer Protocol (FTP) server connected to the network side of the CMTS, to an end station (e.g., personal computer) connected to a cable modem on the cable network, and the transmission of a TCP ACK from that station to the FTP server. The FTP server transmits the data to the CMTS at the speed allowed by the physical characteristics of the network connection and the congestion on that network. Let us assume that this is only a 10 Mbps Ethernet connection. The CMTS transmits that packet to the cable modem, at the speed allowed by the downstream modulation in use, with the latency introduced by the interleaver in use. The cable modem transmits that packet to the end station at the speed allowed by the network connection between the cable modem and the station, let's say a 10 Mbps Ethernet connection.

The end station now transmits a TCP ACK packet back to the FTP server. The ACK packet crosses the 10 Mbps Ethernet connection and arrives at the cable modem. The cable modem now needs to transmit that packet to the CMTS so that it can be delivered to the FTP server. FIG. 1 shows the nine steps numbered 1–9 of a bandwidth request/grant cycle for cable modems, with no collisions. As shown in FIG. 1, the cable modem must first request a data grant, at step 1. For this purpose, the cable modem selects one of the contention regions of the upstream bandwidth and transmits a request packet. After a MAP interval of 1–4 ms, the modem receives the MAP at step 2. There is some period of delay of 0–4 ms within the REQ opportunity occurs. The modem sends a bandwidth request, step 3. After processing of the request at step 4, the CMTS sends a MAP with a grant of bandwidth to the modem at step 5. There is a further delay until the grant opportunity occurs, step 6. Eventually, the modem transmits its ACK packet at step 7, with some transmission delay incident thereto. After receipt of the ACK at the cable modem, step 8, and after some processing delay, the ACK is passed on by the CMTS to the server or destination at step 9. The total period of the delay, assuming no collisions is between 4 and 33 milliseconds.

There is a possibility of a collision on the bandwidth request packet in the upstream path. Specifically, this packet may collide with one or more other request packets transmitted by other cable modems on the cable network. If it does, the cable modem will recognize this fact only by following the bandwidth allocations of the CMTS—if the MAP messages (which allocate bandwidth in the upstream) indicate that requests more recent than this cable modem's request have already been processed, the cable modem will determine that a collision has occurred. In that case, the cable modem backs off a random amount of time and transmits another request, in another request region. Steps 2–6 of FIG. 1 are repeated for each collision cycle, with a delay of 2–33 ms per collision cycle. Let us say that the request is received by the CMTS. At this point, the CMTS will schedule the data transmission of this cable modem, at a point in the future. The time elapsed per collision cycle is determined by several factors: utilization of upstream bandwidth, the frequency with which the scheduler can transmit maps and the latency of map transmissions as dictated by the processing time of the CMTS, the modulation and interleaver type in use on the downstream, and some guard time for processing overhead at the cable modem.

Even with collisions the cable modem will eventually receive the data grant, and will transmit the data on the upstream at the allocated time. Because of the different speeds of the upstream and downstream links, data transmission can take from 3 to 20 times longer in the upstream direction than the downstream direction. Taking all of this into account, the request/grant time for a modem can take 5 to 35 ms with no request collision, or if there are collisions, an additional 2 to 33 ms per collision.

The result of the upstream data delay relative to the downstream data, is that ACK messages get queued up at the cable modem, as shown in FIG. 2. FIG. 2 is a drawing showing the timing sequence of message between the FTP server and the host and cable modem in the present example. The FTP server, which sends data to the host or end station via the large bandwidth downstream pipe, will send a full window's worth of data (in multiple packets) to the host and then wait for an ACK message from the host. The host in turn will generate multiple ACK messages as it begins receiving the data packets. These messages get sent to the cable modem, which begins the request/grant process in order to send the data upstream. Because this process is longer than the rate at which the host will send ACK messages for the first set of data, the ACK messages will begin to get backed up at the cable modem. This means that the server cannot send any more data to the host until it gets an ACK message. The net result is that ACK messages are slowly cleared out of the queue and therefore the server ends up sending only one or two packets at a time. This essentially drives the "available" TCP window size at any time to the size of few packets—far short of what is theoretically possible. The result appears to the user as a slow connection.

The above discussion and illustrative example of FIG. 2 indicates a delay problem with a DOCSIS-compliant data-over-cable system that can substantially detract from the performance and efficiency of the system. The present invention provides methods and apparatus by which TCP throughput in a DOCSIS-type implementation is increased, thereby improving the efficiency of a data-over-cable system. The present invention has the advantage that it requires the modification of only DOCSIS-specific modules of the CMTS, or in alternative embodiments of the cable modems, but which does not prohibit the co-existence of implementations of other existing solutions, such as the ACK spoofing or ACK filtering approaches described previously. Furthermore, no modification of the TCP stacks in the host or end station is required. The invention is transparent to the user; the only effect that they see is a faster connection.

SUMMARY OF THE INVENTION

In a first aspect, a method of reducing latency in a data-over-cable system having a cable modem termination system and a cable modem in communication with each other over a cable network is provided. The method comprises the steps of:

(a) transmitting data associated with either (i) packet arrival times or (ii) latency between grants of bandwidth and packet arrival times from a cable modem to a cable modem termination system; and (b) transmitting from the cable modem termination system grants of bandwidth in an upstream direction to the cable modem at intervals obtained from said data in step (a). The grants of bandwidth are timed to arrive simultaneously with or shortly after arrival of additional packets at the cable modem for transmission to the cable modem termination system. Thus, the buildup of packets at the cable modem, such as the buildup of TCP ACK packets, can be avoided. The concept applies to other types of data packets, including voice packets. Additionally, the transmission of grants of bandwidth can be shifted or adjusted in time so as to arrive at the cable modem at the same time or shortly after the arrival of a packet from an end station connected to the cable modem, such as a Voice over Internet Protocol (VoIP) application.

In one embodiment the method further comprises the step of transmitting TCP ACK packets from the cable modem to the cable modem termination system in response to the grants of bandwidth. This is particularly suitable in file transfer sessions in which TCP ACK packets would otherwise build up.

The data transmitted in step (a) can take a variety of forms and formats. In one embodiment it comprises a time stamp indicating the arrival time of a packet at the cable modem. From a set of time stamps, and knowledge of latency on the transmission path in the downstream direction, the latency at the cable modem can be determined. The latency can be corrected for by adjusting, in time or in frequency, the transmission of grants of bandwidth to the cable modem. In one preferred embodiment, the time stamp is synchronized with a DOCSIS system clock.

The data transmitted in step (a) is transmitted in an extended header in a DOCSIS MAC header in a preferred embodiment. Other formats are also possible.

As another possible format for transmission of the data in step (a), the data in step (a) may comprise a report indicating the arrival times of a number of packets at the cable modem for transmission to the cable modem termination system.

As another alternative, the data in step (a) comprises a report indicating the amount of latency for at least one packet arriving at the cable modem for transmission to the cable modem termination system.

As another alternative, the data in step (a) is stored in a managed object at the cable modem (such as a Simple Network Management Protocol (SNMP) MIB) and accessed by the cable modem termination system.

The determination of latency provided by the invention can be used to adjust or shift a nominal grant interval boundary during which grants of bandwidth are issued. The grant interval boundary can be shifted by an amount indicated by the data in step (a), e.g., the latency L, so as to time the arrival of grants of bandwidth at the cable modem with the arrival of a packet at the cable modem for transmission to the cable modem termination system.

In another aspect of the invention, a method for minimizing accumulation of TCP ACK packets at a cable modem is provided, comprising the steps of:
 a) the cable modem time stamping the arrival of TCP ACK packets from an end station connected to the cable modem;
 b) transmitting one or more packets from the cable modem to a cable modem termination system containing data associated with a plurality of the time stamps; and
 c) the cable modem termination system obtaining from the time stamps a periodicity of TCP ACK packets arriving at the cable modem and responsively conducting a grant of bandwidth service for the cable modem based on the periodicity for transmission of the TCP ACK packets to the cable modem termination system.

In accordance with this aspect of the invention, the build-up of TCP ACK patents at the cable modem can be avoided. Numerous preferred embodiments and techniques for carrying out this embodiment of the invention are described in more detail below.

There are alternatives to transmitting time stamps to the cable modem termination system which will achieve the same result. In one alternative embodiment, the cable modem determines the latency between the arrival of TCP ACK packets from an end station connected to the cable modem and grants of bandwidth from a cable modem termination system. The cable modem transmits one or more packets to the cable modem termination system containing data associated with the determination of latency. This data can for example take the form of tables, reports, or a simple numerical value. The cable modem termination system responsively conducts a grant of bandwidth service for the cable modem based on the latency. The grant of bandwidth service may be responsively shifted in time, or changed in frequency so as to time the grants of bandwidth such that they arrive simultaneous with or shortly after the arrival of the packets (TCP ACK, voice, etc.) at the cable modem.

In yet another aspect of the invention, an improvement to a cable modem having a memory is provided. The improvement comprises software or hardware apparatus recording in the memory the time at which packets arrive at the cable modem from an end station connected to said cable modem and communications apparatus including software in the cable modem forwarding the time recorded in the memory to a cable modem termination system. Alternatively, the software or hardware apparatus records in the memory the latency between time of arrival of packets at said cable modem from an end station connected to said cable modem and the grants of bandwidth for forwarding said packets to the cable modem termination system. The communications apparatus includes software either forwarding data associated with the latency to the cable modem termination system or otherwise making it available, such as in a managed object.

In still another embodiment, an improvement is provided to a cable modem termination system transmitting grants of bandwidth in an upstream direction to cable modems during a nominal grant interval boundary. The improvement comprises software responsive to information as to latency between arrival of packets at the cable modem and previous grants of bandwidth and responsively adjusting the timing of the nominal grant interval boundary to thereby time the arrival of grants of bandwidth so as to arrive simultaneous with or shortly after the arrival of packets at cable modem from an end station connected to the cable modem. In this latter aspect of the invention, the packets may comprise voice packets, such as packets encoded by a G.711 CODEC, or any other real time multimedia data.

In a still further aspect, a method is provided for decreasing latency in a VoIP session between a cable modem and a cable modem termination system. The cable modem termination system periodically transmits grants of bandwidth during a nominal grant interval having a boundary in time commencing the nominal grant interval. The method comprises the steps of:
 a) determining the latency L between a nominal interval grant boundary and the arrival of a voice packet at the cable modem;
 b) the cable modem termination system determining the latency L (either directly by the cable modem transmitting the latency L to the cable modem termination system, by the use of periodic reports, using managed objects accessible to the cable modem termination system, etc.); and
 c) the cable modem termination system adjusting or shifting the nominal interval grant boundary an amount equal to L.

When the nominal grant interval is shifted, the grants of bandwidth are timed to arrive at the same time or shortly after the arrival of the voice packets at the cable modem, resulting in elimination of the latency.

These and many other aspects and features of the invention will be more apparent from the following detailed description of presently preferred and alternative embodiments of the invention.

BRIEF DESCRIPTION OF THE DRAWINGS

FIG. 1 is an illustration of the delay that occurs in the prior art request/grant cycle for cable modem transmissions in the upstream direction to the cable modem termination system;

FIG. 2 is an illustration of how TCP ACKs can get backed up at a cable modem when the request/grant cycle of FIG. 1 is used;

DETAILED DESCRIPTION OF THE PREFERRED EMBODIMENT OF THE INVENTION

Before describing the inventive methods in detail, a review of an example of a data-over-cable system will be set forth initially for ease of understanding. Then, a method of predictive unsolicited grant service enhancements to improve TCP throughput will be described. The method for communication of packet arrival times is particularly useful when employing predictive unsolicited grant service to improve TCP throughput in a cable modem system. Numerous alternative embodiments of the invention will also be described, including a voice application in which the timing of grants of bandwidth is synchronized to the arrival of voice packets at the cable modem.

Figure 3:
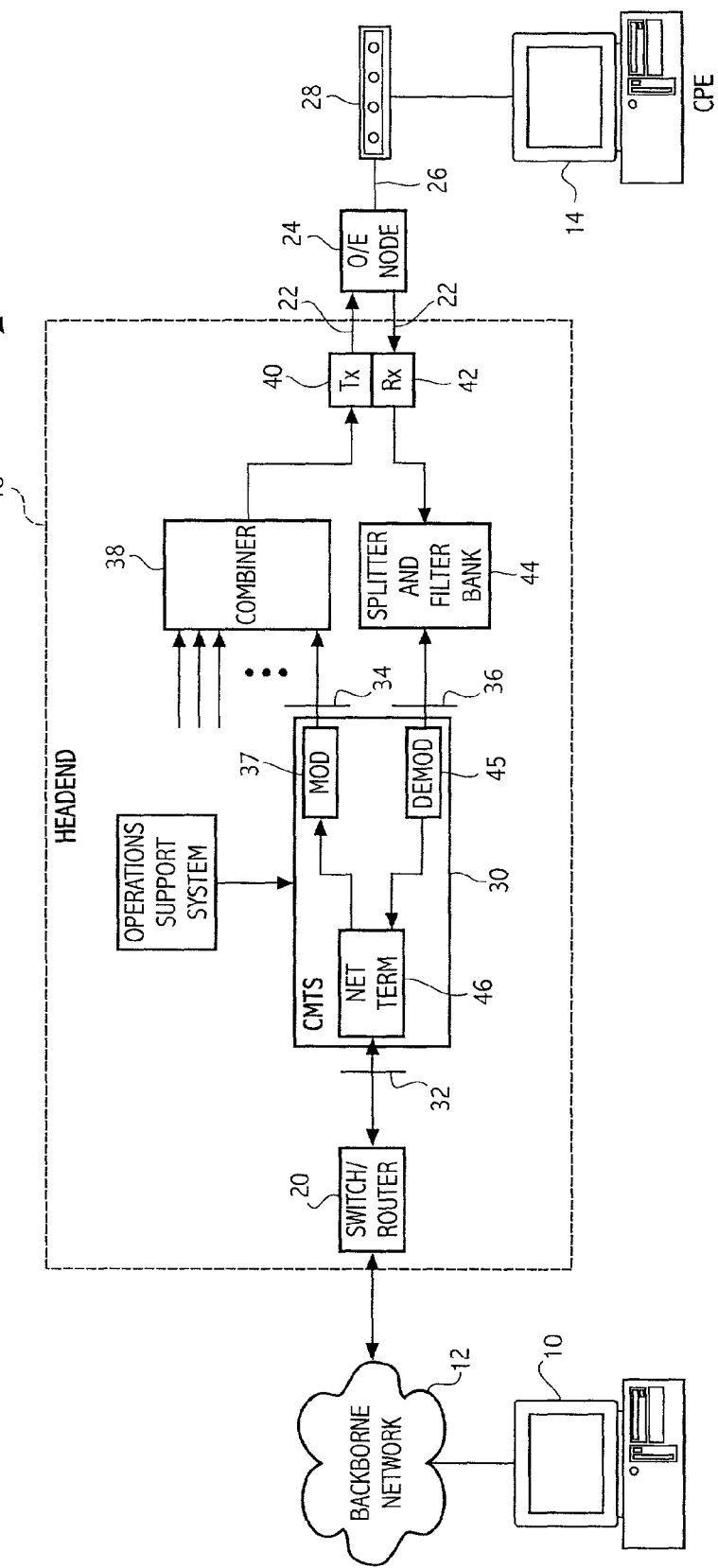
FIG. 3 is a block diagram illustrating a basic architecture for a data-over-cable system.

FIG. 3 is a block diagram illustrating the basic overall architecture of a data-over-cable system. The system of FIG. 3 is intended to be representative and not limiting of the type of situation in which the invention can be practiced. The system provides a mechanism by which a computer 10 connected to a backbone network 12, either directly or indirectly by intermediate networks, may communicate with another computer 14 via a data-over-cable infrastructure indicated generally by reference numeral 16. The cable television infrastructure 16 includes a distribution hub or "head-end" 18 that is connected to the backbone network 12 via a switch or router 20. The cable system head-end 18 is typically a central location in the cable television network that is responsible for sending cable signals in the downstream direction as defined below. The head-end 18 modulates digital data from the backbone network 12 into analog form and supplies the analog signals to a fiber network 22, which is connected to a plurality of optical/electronic ("O/E") nodes 24. The O/E nodes 24 convert optical signals in the fiber network 22 to electrical signals for transmission over a coax cable network 26 to a cable modem 28 at the customer's location. The cable modem 28 demodulates the analog signals, extracts the digital data, and supplies the data to the customer premise equipment ("CPE") 14. The CPE 14, in a typical situation, is a general purpose computer in a home environment but may alternatively be a multimedia display device or a point-of-sale terminal in a store.

The head-end 18 includes a cable modem termination system ("CMTS") 30. This device provides a network side interface to a wide area network, indicated at 32, and a radio frequency ("RF") interface between the CMTS 30 and the cable network in both the downstream and upstream directions, indicated respectively at 34 and 36. As used in the present document, the term "downstream" refers to transmission in the direction from the head-end 18 or CMTS 30 to the cable modem 28 at the customer premises. The term "upstream" refers to transmission in the direction from the cable modem 28 to the CMTS 30.

For transmission in the downstream direction, the CMTS 30 supplies data received from the computer 10 through the network 12 to a modulation circuit ("MOD") 37 and then to a combiner 38, which combines the data with video signals for the cable television system. The combined signals are sent to a transmission module 40 where they are imparted onto the fiber network 22.

In a typical two-way cable system, also termed a bi-directional cable system, a cable modem 28 will transmit data packets to the CMTS 30 over one or more upstream channels on the cable television network 22 and 26. In the upstream direction, the cable modem 28 transmits data from the CPE 14 over the cable network 26 and 22, which is received at a receiver module 42. The receiver module 42 couples the upstream signal to a splitter and filter bank 44 which separates the data signal from video signals for the cable television system and couples the data signal to a demodulation circuit ("DEMOD") 45 as in the CMTS 30. A network termination unit 46 processes the data, sends the data to the switch or router 20, and routes the data onto the network 12 for transmission to the remote computer 10.

A data packet may carry, as its payload, information that is sent from the CPE 14 and destined for the CMTS 30. The cable modem 28 adds overhead to the data packet to maintain the integrity of the payload. Examples of overhead include redundant bits for error correction and preambles. On the cable network 22 and 26 side of the cable modem 28, the cable modem 28 transmits from and receives the data packet and overhead in the form of digitally modulated radio frequency carriers. An exemplary bi-directional data-over-cable system includes customer premises equipment 14 (e.g., a customer computer), a cable modem 28, a CMTS 30, a cable television network 18, 22, 26, and a backbone data network 12 (e.g., the Internet).

Cable modems and cable modem termination systems include those provided by 3Com Corporation of Santa Clara, Calif., Motorola Corporation of Schamburg, Ill., Bay Networks of Santa Clara, Calif., Scientific-Atlanta of Norcross, Ga., and others.

Cable modem protocol stack

Figure 4:
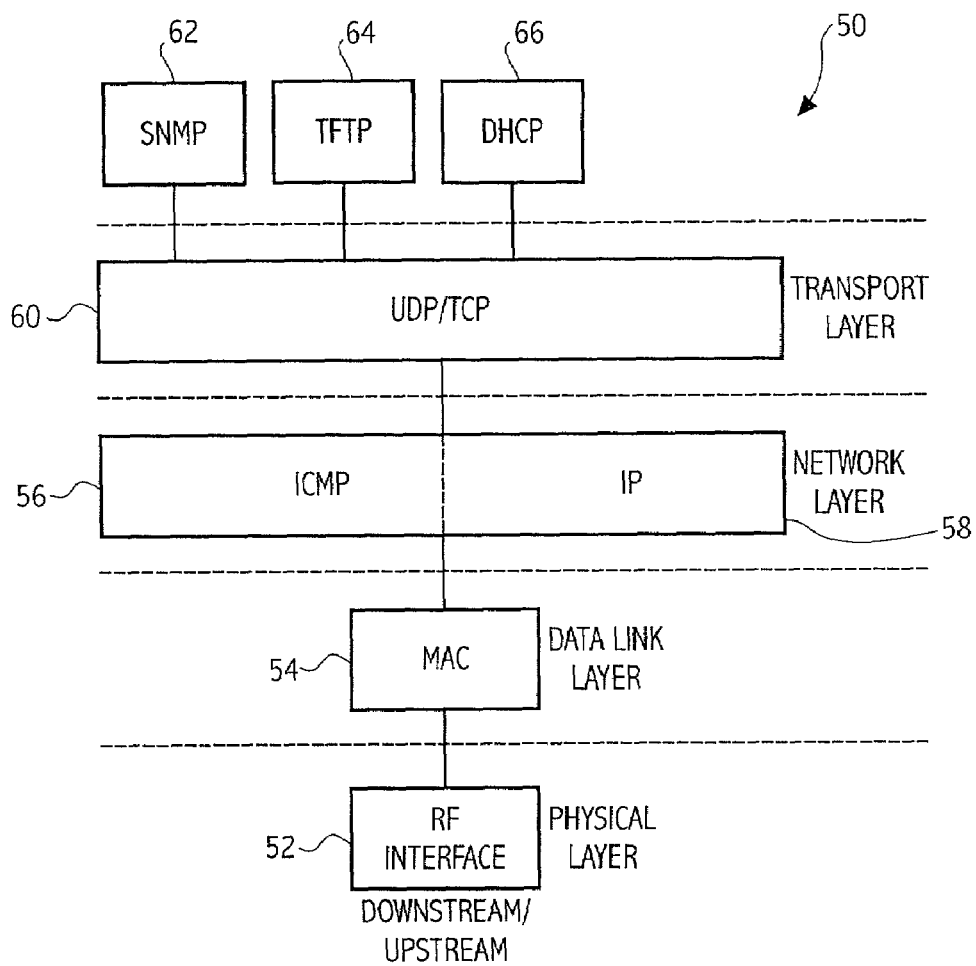
FIG. 4 is a block diagram illustrating a protocol stack for a cable modem in the data-over-cable system depicted in FIG. 3.

FIG. 4 is a block diagram illustrating a protocol stack 50 for the cable modem 28. FIG. 4 illustrates the downstream and upstream protocols used in the cable modem 28. As is known in the art, the Open System Interconnection ("OSI") model may be used to describe computer networks. The OSI model consists of seven layers including, from lowest-to-highest, a physical, data-link, network, transport, session, presentation and application layer. The network layer places routing information into the data packets. The data link layer transmits data packets. The physical layer transmits the data packets and overhead as bits over a communication link.

For data transmission over a bi-directional data-over-cable system, the cable modem 28 connects to the cable network 26 in a physical layer via a radio frequency ("RF") interface 52. In an exemplary preferred embodiment of the present invention, the RF interface 52 has an operation frequency range of approximately 50 Mega-Hertz ("MHz") to 1 Giga-Hertz ("GHz") and a channel bandwidth of 6 MHz on the downstream channels. In another exemplary preferred embodiment of the present invention, which relates to a bi-directional data-over-cable system, the RF interface 52 has an operation frequency range of approximately 5 MHz to 42 MHz on the upstream channels. However, other operation frequencies and bandwidths may also be used and the invention is not limited to these frequencies and bandwidths. The RF interface 52 preferably uses a signal modulation method of Quadrature Amplitude Modulation ("QAM"), although other methods may alternatively be used. As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels.

The RF interface 52 uses QAM-64 or QAM-256 for downstream transmission. The upstream transmission uses QAM-16 or Quadrature Phase-Shift-Keying ("QPSK"). For the upstream embodiment, the symbol rate of upstream transmission may be 160, 320, 640, 1,280, or 2,560 kilo-symbols per second ("ksym/sec") for 16-QAM, or 160, 320, 640, 1,280, or 2,560 ksym/sec for QPSK. However, other operating frequencies, modulation methods, and symbol rates may alternatively be used. However, other RF interfaces 52 could also be used and the present invention is not limited to interfaces complying with DOCSIS.

Referring again to FIG. 4, above the RF interface 52 in a data-link layer is a Medium Access Control ("MAC") layer 54. As is known in the art, the MAC layer 54 controls access to a transmission medium via the physical layer. Information on the MAC layer protocol 54 may be found in DOCSIS. However, other MAC layer 54 protocols may alternatively be used and the preferred embodiments are not limited to DOCSIS MAC layer protocols.

Above both the downstream and upstream data-link layers in a network layer 52 is an Internet Protocol ("IP") layer 58. The IP layer 58, hereinafter IP 58, roughly corresponds to OSI layer 3, the network layer, but is typically not defined as part of the OSI model. As is known in the art, the IP 58 is a routing protocol designed to route traffic within a network or between networks. Additional information on the IP 58 may be found in the Internet Engineering Task Force ("IETF") standard Request For Comments ("RFC") 791—Internet Protocol, dated September 1981, incorporated herein by reference.

Also within the network layer of the protocol stack 50, an Internet Control Message Protocol ("ICMP") layer 56 is used for network management. The main functions of the ICMP layer 56, hereinafter ICMP 56, include error reporting, reachability testing (e.g., "pinging"), congestion control, route-change notification, performance, and subnet addressing. Since the IP 58 is an unacknowledged protocol, datagrams may be discarded and the ICMP 56 is used for error reporting. Additional information on the ICMP 56 may be found in IETF standard RFC 792—Internet Control Message Protocol, dated September 1981, incorporated herein by reference.

Above the IP 58 and the ICMP 56 is a transport layer with a User Datagram Protocol ("UDP") layer 60. The UDP layer 60, hereinafter UDP 60, roughly corresponds to OSI layer 4, the transport layer, but is typically not defined as part of the OSI model. As is known in the art, the UDP 60 provides a connectionless mode of communication with datagrams. Additional information on the UDP 60 may be found in IETF standard RFC 768—User Datagram Protocol, dated Aug. 28, 1980, incorporated herein by reference. The TCP discussed earlier lies at this layer.

Above the transport layer are a Simple Network Management Protocol ("SNMP") layer 62, a Trivial File Transfer Protocol ("TFTP") layer 64, and a Dynamic Host Configuration Protocol ("DHCP") layer 66. The SNMP layer 62 is used to support network management functions. Additional information on the SNMP layer 62 may be found in IETF standard RFC 1157—A Simple Network Management Protocol (SNMP), dated May 1990, incorporated herein by reference. The TFTP layer 64 is a file transfer protocol used to download files and configuration information. Additional information on the TFTP layer 64 may be found in IETF standard RFC 1350—The TFTP Protocol (Revision 2), dated July 1992, incorporated herein by reference. The DHCP layer 66 is a protocol for passing configuration information to hosts on an IP 54 network. Additional information on the DHCP layer 66 may be found in IETF standard RFC 2131—Dynamic Host Configuration Protocol, dated March 1997, incorporated herein by reference. More or fewer protocol layers could also be used with a data-over-cable system 16.

Upstream data transmission

A cable modem 28 typically transmits on an upstream channel during a transmission mini-slot allocated by the CMTS 30. The upstream channel may be viewed as time-divided into a stream of mini-slots, each of which is a unit of granularity for upstream transmission opportunities. The CMTS 30 also times the mini-slots to prevent collisions between the transmissions from different cable modems by instructing the cable modems 28 to transmit alternately during the mini-slots.

Figure 5:
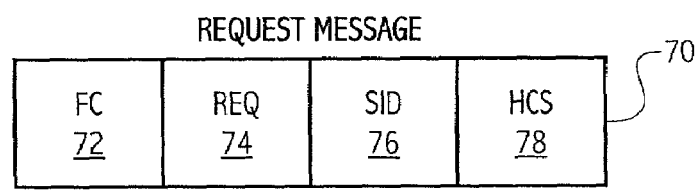
FIG. 5 is a block diagram illustrating a structure of a Request message that may be transmitted by a cable modem in the data-over-cable system of FIG. 3.

Before transmitting data, however, a cable modem 28 must first request permission to transmit from the CMTS 30, unless an unsolicited grant of bandwidth has been sent to the cable modem (as set forth below). A cable modem 28 that wishes to transmit sends a Request MAC 54 message to the CMTS 30. FIG. 5 is a diagram illustrating a preferred structure of a Request message 70. The Request message 70 includes a frame control field 72 ("FC"), a bandwidth request field 74 ("REQ"), a service identifier field 76 ("SID"), and a MAC 54 header check sequence field 78 ("HCS"). Descriptions for the Request message 70 fields are shown in Table 1.

TABLE 1

| Request message 70 Parameter | Description |
| --- | --- |
| FC 72 | Frame control. Identifies type of MAC 54 message. |
| REQ 74 | Total amount of bandwidth requested in mini-slots. |
| SID 76 | Service Identifier for the |

TABLE 1-continued

| Request message 70 Parameter | Description |
| --- | --- |
|  | cable modem 28 that sent the REQ message. |
| HCS 78 | MAC 54 header check sequence. |

The SID 76 is a unique identifier for the cable modem 28 that is requesting permission to transmit. The SID 76 may be assigned by the CMTS 30 when the cable modem 28 initializes and registers with the CMTS 30 as discussed below. The REQ 74 field contains a measure of how much bandwidth, i.e. mini-slots, the cable modem 28 requests for the transmission of its data to the CMTS 30.

Figure 6:
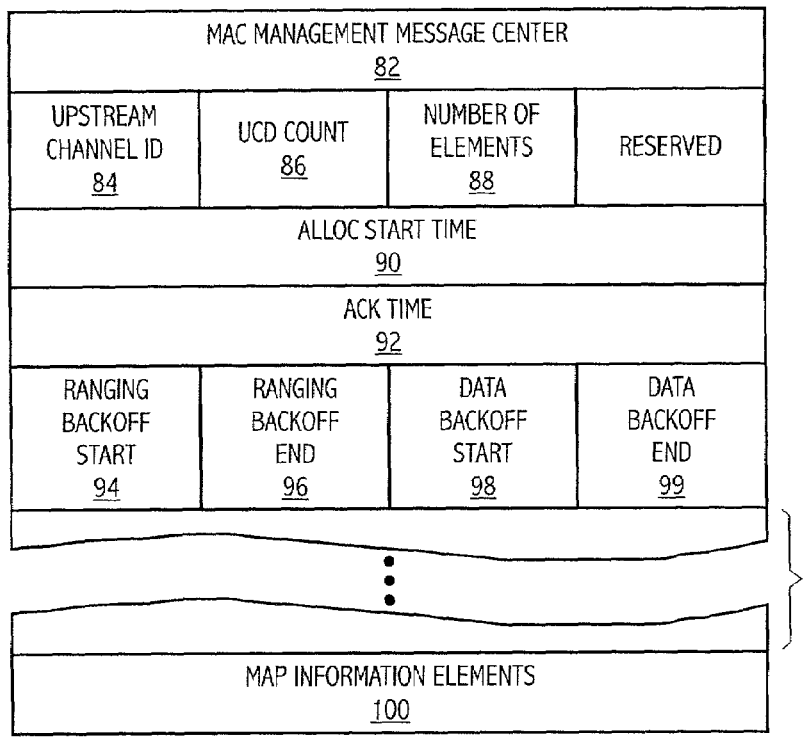
FIG. 6 is a block diagram illustrating the structure of a MAP message transmitted by a CMTS in the data-over-cable system of FIG. 3.

In response, the CMTS 30 builds an Upstream Bandwidth Allocation Map message 80 ("MAP") and transmits it via the downstream channel to all cable modems. Typically, the CMTS 30 receives requests from a number of cable modems that wish to transmit and may allocate one or more transmission mini-slots to each of the cable modems 28. The MAP message 80 then informs each cable modem 28 of its permitted mini-slot(s) for transmission. FIG. 6 is a block diagram illustrating the structure of a preferred MAP message 80. The MAP message 80 includes a MAC 54 management header field 82, an upstream channel identifier field 84, a upstream channel descriptor count field 86 ("UCD Count"), a number of elements field 88, a reserved field, an allocation start time field 90 ("Alloc Start Time"), an acknowledgment time field 92 ("Ack Time"), a ranging backoff start field 94, a ranging backoff end field 96, a data backoff start field 97, a data backoff end field 99, and a MAP information elements field 100. Descriptions for the MAP message 80 fields are shown in Table 2.

TABLE 2

| MAP message 80 Parameter | Description |
| --- | --- |
| MAC 54 Management Message Header 82 | The header of this message identifying it as a MAP message. |
| Upstream Channel ID 84 | The identifier of the upstream channel to which this message belongs. |
| UCD Count 86 | Matched the value of the Configuration Change Count of the UCD which describes the burst parameters which apply to this map. |
| Number of Elements 88 | Number of information elements in the map. |
| Alloc Start Time 90 | Effective start time from CMTS 30 initialization (in mini-slots) for assignments within this map. |
| Ack Time 92 | Latest time, from CMTS 30 initialization, (mini-slots) processed in upstream. |
| Ranging Backoff Start 94 | Initial back-off window for initial ranging contention. |
| Ranging Backoff End 96 | Final back-off window for initial ranging contention. |
| Data Backoff Start | Initial back-off window for contention data and requests. |
| Data Backoff End | Final back-off window for contention data and requests. |
| MAP Information Elements 100 | Encoded data blocks that designate the allocation of transmission mini-slots on the upstream channel. |

The MAP message 80 informs the cable modems 28 of the allocation of mini-slots for a scheduled upstream usage interval and when to begin the usage interval. In a given upstream usage interval, selections of the cable modems 28 alternately transmit on the upstream channel. As is known in the art, each upstream usage interval is composed of transmission intervals, also referred to as "bursts," which comprise at least one mini-slot.

The upstream channel identifier field 84 within the MAP message 80 includes an identifier for the upstream channel to which the MAP message 80 applies. As is known to those skilled in the art, the data-over-cable system 16 may support upstream transmission on more than one upstream channel. For example, a common head-end 18 may serve more than one branch of HFC paths 22–26, and each branch may require a unique upstream channel for reasons of network configuration. In such a case, the Upstream Channel ID 84 may distinguish between the branches. Thus, the MAP message 80 intended for the cable modems 28 served by one branch may be distinguished from the MAP messages 80 for cable modems 28 on other branches by use of the Upstream Channel ID 84.

Figure 7:
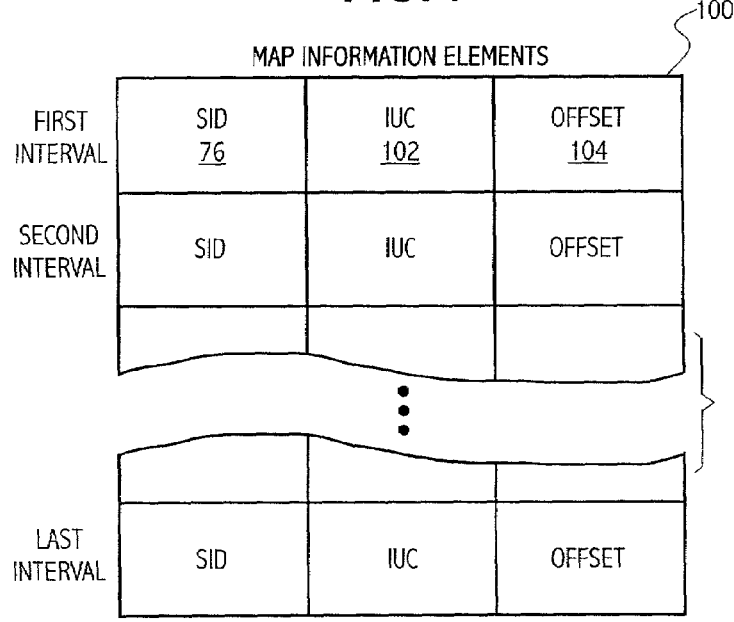
FIG. 7 is a block diagram illustrating the structure of MAP Information Elements that may appear in the MAP message of FIG. 6.

The MAP Information Elements field 100 designates the order and duration of the transmissions from the cable modems 28 for the upstream channel. As described in DOCSIS, one element may describe each transmission. The Number of Elements field 88 contains the total number of such elements. FIG. 7 is a block diagram illustrating a preferred structure of the MAP Information Elements 100. Each interval includes a field for the SID 76 of the cable modem 28 that is permitted to transmit in each interval. The Interval Usage Code field 102 ("IUC") informs the cable modem 28 what kind of upstream transmission is permitted in the interval. The offset field 104 specifies when the transmission interval occurs. In this manner, the series of intervals permit the selection of cable modems 28 to deliver their data packets to the CMTS 30 without the transmissions colliding on the upstream path.

The IUCs 102 are values that designate the type of transmission that is permitted in each interval. The cable modems 28 may be capable of several types of transmission. For example, the transmission may be for the purposes of ranging, allowing a cable modem 28 to compensate for delay on the cable network. Additionally, the transmission may be for the purpose of delivering a data packet to the CMTS 30. Two types of data transmissions typically occur: a short data grant or a long data grant. These data grants correspond to IUCs 102 that are described in DOCSIS. For example, a short data grant may be appropriate when the CPE 14 only has a small amount of data to transmit on the upstream channel, such as a few keystrokes or the opening of a hyperlink on a web page. A long data grant may be appropriate when the CPE 14 requests to transfer a file through the backbone network 12. A Request Interval, i.e., a notification of when a modem is allowed to make a request for bandwidth, is another type of IUC. In this manner, the CMTS 30 instructs the cable modem 28 when to transmit, on which upstream channel, and what type of data to transmit.

It should be understood, however, as alternatives to the foregoing, that other field settings for the Request message 70, the MAP message 80, and the MAP Information Elements 100 might be used.

Further background details are either known in the art or described in the DOCSIS RFI specification and the reader is directed to that document for further details.

Predictive Unsolicited Grant Service

The CMTS 30 provides grants of bandwidth to the cable modem 28 with a timing such that there is no need for the cable modem to request the grants, such that when the cable modem receives TCP ACKs from the end station (CPE 14) connected to it there will be a bandwidth grant basically already at the cable modem to be used in the upstream transmission of the TCP ACK (i.e., arriving simultaneous with or arriving shortly after the TCP ACK arrives from the end station). Several methods are described in detail to achieve this result. By having the grant of bandwidth already at the cable modem and available for use with the TCP ACK, the latency associated with transmission of the ACK to the CMTS, as illustrated in FIG. 1, can be reduced.

For this system to work, the CMTS must be able to predict the time slot at which the cable modem will require the data grant. Each data grant also specifies the size of the bandwidth granted to the cable modem; therefore the CMTS must be able to predict the size of the ACK packet. An example of how this delay can be determined is set forth below, but the general principles involved will be described first.

Data Grant Sizes

TCP performs the ACK function by having the receiver send a packet to the sender with the acknowledgment sequence number field set to a value indicating the next expected byte from the sender. If the receiver has some data of its own to transmit, it simply uses that packet to transmit the ACK. This method is often referred to as ACK piggybacking. If it does not have any packets to transmit, the receiver generates a TCP packet with no payload, so that it may transmit its acknowledgment. ACK piggybacking is possible in interactive TCP sessions, where both sides have data to transmit, such as TELNET or Rlogin. In Bulk Transfer sessions, however, such as FTP, after an initial setup and request, one side assumes the role of sender, and the other side simply receives data until the end of the session. In such bulk transfer sessions, all TCP ACKs, except for the initial few and the final few, carry no payload, and are therefore of a uniform size of 20 bytes, at the network layer. Depending on the medium in use, a fixed number of bytes are added for lower layer headers, as well. In the case of an upstream ACK packet, in the DOCSIS standard, all zero-payload ACKs would be structured as shown in FIGS. 6 and 7.

Timing the Transmission of the Unsolicited Grants

The host requirements RFC, RFC 1122 part of STD0003, stipulates that hosts should implement a delayed ACK, with a timer value less than 500 msec. Delayed ACK method is described in RFC813. Delayed ACK works as follows: a host does not immediately transmit an ACK for a data packet it receives. Instead it waits to see if it needs to send a data packet itself, in which case, the ACK can be sent in the data packet, by setting the ACK sequence number of the data packet appropriately. This goal is accomplished by having a timer fire every X msec, where X is a fixed value less than 500, and sending an ACK only when it can be piggybacked with another data packet or when the timer fires. Today, most implementations use a 100 or 200 msec ACK timer. Receivers also like to have only one unacknowledged packet at a time, so, if a second packet arrives before the ACK timer fires, the two packets are acknowledged with a single ACK generated immediately upon arrival of the second packet. This is also stipulated as a "should" by the host requirements RFC.

There are, then, three distinct events which cause a receiver to transmit ACK packets. In order of precedence, these are as follows:

1.) The receiver has some data it needs to send. (This is the piggyback situation)

2.) The receiver receives data when it already has an unacknowledged packet. (This situation is referred to as the "every-other" situation)

3.) The ACK timer fires and the receiver has an unacknowledged packet. (This is referred to as the "delayed" situation)

As we stated earlier, the first case is usually of no concern, because it occurs very infrequently in bulk transfer sessions, which are where the delayed ACK problem is most acute. The latter two events will be discussed here, as to how their timing can be predicted.

Starting with number 3) above, we will discuss how we can predict the period of the ACK timer. The ACK timer fires with a period which is a fixed interval from a fixed time in the past. In other words, it is not re-set after the booting of the kernel. Its firing period is always constant. It results in the transmission of an ACK, precisely because there is an unacknowledged packet in the receiver's buffers and there is no data to piggyback that ACK in. Therefore, the sizes of all ACK transmitted as a result of the ACK timer must be the size of the no-payload IP packet. Those ACKs which were transmitted as a result of the "every-other" strategy will also be of the same size. The difference will be that the actual transmit time of the delayed ACKs will always be separated by a time which will be multiple of a constant value equal to the ACT timer frequency. We can thus distinguish these packets.

The CMTS, acting as a gateway between the two end stations of the TCP session, is privy to both the data packets and the acknowledgment packets for that session. Moreover, being at the edge of the network, it is possible to make fairly safe assumptions as to the amount of latency between the receiver and the CMTS. On the downstream, this latency is a factor of the modulation and interleaver types in use, which are known. On the upstream, this latency is a factor of the modulation type in use, as well as the amount of collision and backoffs that occur in the non-unicast contention regions. However, since we will be dealing with unsolicited grants in our method, we are not interested in latency caused by contention. We simply suggest that the CMTS can measure its internal latency, and it can determine the wire propagation delay on the upstream and the downstream since these are well known numbers for each modulation/ interleaver combination. We also note that the timing idea we teach here is self-adjusting, in that, once the CMTS starts this service, it monitors its usage and adjusts the timing of the unsolicited grants as they are needed.

Therefore, in one aspect of the invention, we provide a data-over-cable system in which the CMTS monitors incoming TCP ACK packets, establishes their periodicity, calculates when these ACK packets arrived at the cable modem from the end-station, and finally establish an Unsolicited Grant Service for that cable modem in manner such that the unsolicited grants arrive at the cable modem from the CMTS at the same time or shortly after the ACKs arrive at the cable modem from the end-station. When this is done, the ACK congestion and slow TCP throughput shown in FIG. 2 is avoided.

Moreover, we suggest that the CMTS monitor the usage of these unsolicited grants and adjust their timing if the CMTS recognizes that the cable is still transmitting ACKs but is not using the unsolicited grants. For example, the frequency may need to be increased, e.g., doubled. The CMTS ceases the Unsolicited Grant Service when it recognizes that the cable modem has stopped transmitting ACKs. We suggest that the CMTS can either monitor all TCP traffic to recognize the beginning and the termination of individual TCP connections (through the SYN and FIN packets), or that the CMTS simply monitor the arrival of ACKs on the upstream, in order to activate this service. We should note that it is expected that not all the unsolicited grants will be used by the cable modem. However, when the ACK timer fires and the cable modem receives an ACK from the end-station, if there is a grant already waiting for it, it will save on the order of milliseconds, most likely about 10 milliseconds, from the transmission time of that ACK. This is an improvement of the typical prior art scenario of FIGS. 1 and 2.

With the method described above, the CMTS will be able to provide data grants for the cable modem to use in the transmission of the ACK packets which were generated as a result of the ACK timer firing—we will call these "ACK timer grants". We suggest that as a second stage of this idea, the CMTS actually generate more unsolicited grants and transmit these with a period greater than the period for the ACK timer grants—we will call these grants "secondary grants". These secondary grants will allow the cable modem to empty its queues of any ACKs that may have backed up because of bursts, or because of upstream collisions. The CMTS may calculate the period for these secondary grants through several methods:

1) The CMTS can in fact monitor TCP packets and keep track of the maximum window size, and simply calculate how many ACKs will be required to sustain traffic with that window size, and provide that number of secondary grants spread between pairs of ACK timer grants.
2) Alternatively, the CMTS can simply take the interval of the ACK timer grant and divide it in two. It would first send only one secondary grant, halfway in the ACK timer grant interval. If it detects that this grant was used, it would increase the number of secondary grants. If these additional grants were also used, it would further increase their number, up until there were no unused grants. We suggest that this method would be implemented as a constantly self-adjusting feedback system. It can be seen that the goal of the entire system is to minimize the impact of the request-grant cycle on the transmission time of TCP ACKs by trying to maximize the number of ACKs that can be transmitted in unsolicited data grant regions.

As an alternative to 1) and 2) above, the CMTS can monitor TCP data packets leaving the CMTS, and it can transmit unsolicited data grants to the cable modem as they are needed. As we described earlier, the end-station will transmit an ACK either when it has an unacknowledged packet and its ACK timer fires, or when it has an unacknowledged packet and it receives a second packet. We therefore suggest a system where the CMTS transmits unsolicited grants timed, as described earlier, to meet the timer initiated ACKS, but also where the CMTS transmits one unsolicited grant for every other data packet that is addressed to a given end station behind a cable modem—we will call these grants "every-other-grant". Similar to the ACK timer grants, the CMTS can time these every-other-grants such that they arrive at the cable modem very shortly after the arrival of the ACK which was transmitted by the end station as a result of the data packet.

The above discussion has been predicated on the use of unsolicited grants as the mechanism for giving the cable modem bandwidth. An alternative mechanism exists. In particular, any of these methods described above can be implemented by using Unicast Request Regions (URR) instead of unsolicited grants. URRs still require the modem to go through the request-grant cycle, but they eliminate the occurrence of collisions during the request process. Thus, while not as much as unsolicited grants, URRs drastically reduce the transmission time of packets in the upstream, especially in systems with a large number of cable modems or high traffic levels or high error/loss probability. Their one advantage over unsolicited grants stems from the fact that if an unsolicited grant is not used by a cable modem, it represents wasted upstream bandwidth of 60–70 bytes, whereas URRs represent a minimum waste of upstream bandwidth.

As an alternative to the CMTS determining the period for sending the unsolicited grants, it is possible that these methods can be implemented at the cable modem. The cable modem can predict the arrival time of the TCP ACKs from the end station using the same methods described so far and the cable modem can initiate the request-grant process before the ACK actually arrives at the cable modem. While distributing the intelligence for bandwidth requests to many end stations has some potential advantages, this method would put cumbersome overhead at the consumer device and may not be a desirable implementation.

Alternatively, a simpler but less effective method could be one where the cable modem, upon detecting that it is being sent TCP ACKs by the end-station attached to it, may simply piggyback requests for bandwidth along with the transmission of each ACK packet on the upstream, regardless of whether the next ACK has arrived at the cable modem or not.

As an added enhancement to these methods, it may be highly desirable that the cable modem and the CMTS establish a separate service class on the upstream, solely for the transmission of TCP ACKs. This service class should be a higher priority class than the service classes used for the transmission of data packets. The DOCSIS standard describes the establishment and use of service classes both during registration and also dynamically during normal operations. While either would work for our purposes, we suggest that this ACK service class be set up during registration so as not to incur the establishment overhead during operations. The DOCSIS standard also clearly describes how traffic classifiers can be used to sort packets into different service classes. The classifier required for the ACK service can be derived from the DOCSIS specification by persons skilled in the art.

Method for Communicating Packet Arrival Times at the Cable Modem, to the Cable Modem Termination System in DOCSIS Systems As noted above, DOCSIS networks compliant to the RFI specification employ a time-slot scheduled Media Access Control (MAC) mechanism for upstream transmissions. Packets which arrive at the Cable Modem (CM) for upstream transmission, are transmitted upstream only when a data grant is granted by the CMTS. It is desirable in such a system to measure the delay induced on the packet while the CM waits for a data grant from the CMTS.

The latency induced on a packet while waiting for the grant will vary greatly depending on the scheduling service in use, the current number of CMs active on the same upstream channel, the system load on the CMTS and even RF plant signal to noise ratio. We would therefore like to define a mechanism which could mark each packet with the time at which that packet was received at the CM. Using this information, the CMTS can deduce the delay incurred by the packet while waiting for the data grant, since the timing of the grant is already known at the CMTS. Accordingly, in a preferred embodiment of the invention the cable modem performs a time stamping function for all TCP ACK packets (or other packets of interest, such as voice packets as described below) indicating the time when the packets arrived at the cable modem from the end station.

While marking the packets with their arrival times, the CM preferably use the DOCSIS system clock tick, which is synchronized between the CMTS and all the CMs on the cable network, via a mechanism defined in DOCSIS RFI specification.

Figure 8:
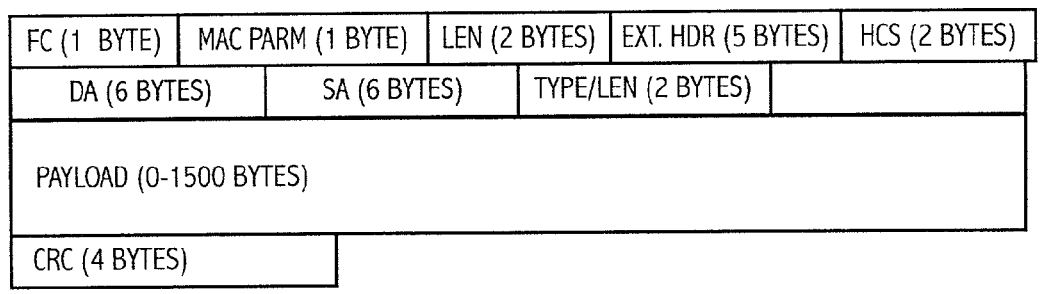
FIG. 8 is a diagram illustrating the unencrypted format for a DOCSIS packet in the upstream direction.
Figure 9:
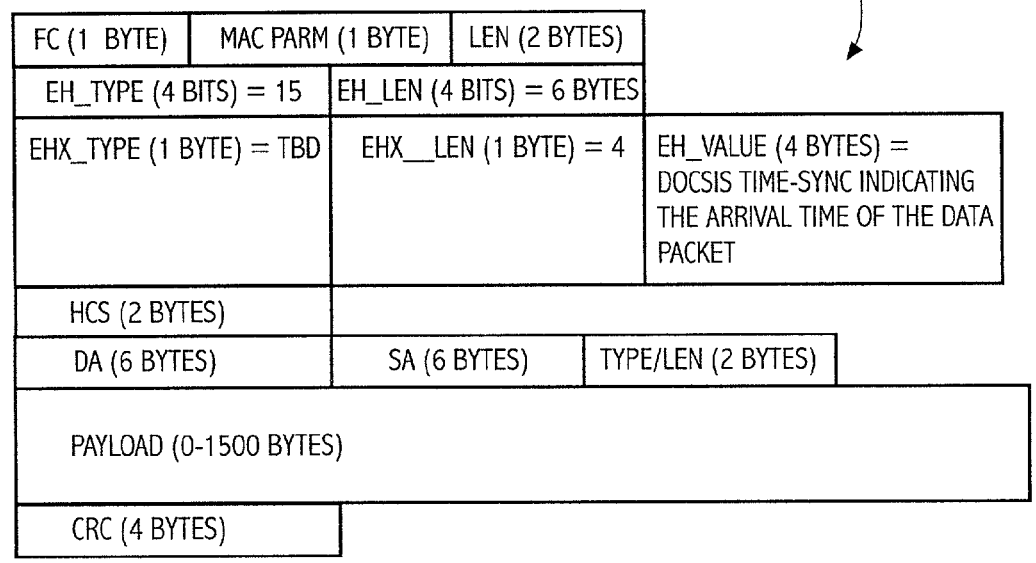
FIG. 9 shows the unencrypted format for a DOCSIS packet with an additional time stamp field in the DOCSIS Extended—Extended Header field, which can be used to time the transmission of grants of bandwidth from the CMTS to the cable modem.

The time stamp or arrival time of the TCP ACK at the cable modem needs to be transmitted to the CMTS. Packets transmitted on the upstream in a DOCSIS system include a DOCSIS MAC header, as well as an Ethernet/802.3 header. Such a packet is depicted in FIG. 8. For the purposes of communicating per-packet delay for all packet types, we define a mechanism which will work for a wide variety of application types, as well as a variety of header types. Thus we need to keep the extensions at the layer which is common to all packets. Therefore, we suggest adding an extended-header field to the DOCSIS MAC header of the packet. Extended header structure is clearly defined in the RFI standard, where a number of extended header types are explicitly defined, but there is also an extended header type which can be used to extend the extended header types. Moreover, a number of extended header types can be presented in the header simultaneously, thus this addition will not inhibit the use of other extended header types, such as the encryption header. Therefore we suggest using the "Extended Extended Header" element, of type 15. For the type field, a value must be acquired by approval from the Cable Television Labs, the governing body of the DOCSIS specification. In the interim, we suggest using the value of 1 for the type field. We suggest a length of 4 bytes, with the 4 byte value containing the 23 bit DOCSIS system clock tick which was recorded by the CM at the time that the TCP ACK packet arrived at the CM. We suggest the upper 9 bits of the field should be all zeroes. FIG. 9 shows the resultant packet, in case of no encryption. Upon receiving these packets, the CMTS can compare the time that the data packet arrived at the CM vs. the time that the data grant had become active. The CMTS can then use this information to calculate the delay incurred by this packet while waiting for the data grant. Obviously, the invention as described herein can be implemented by persons skilled in the art using any suitable hardware and/or software, which can be readily developed from the disclosed methods.

Alternatively, we suggest that the CM may calculate the delay itself, and communicate this value to the CMTS, rather than the arrival time of the packet. We suggest using another Extended Extended Header Element Type for this usage. The value of this type must be acquired by approval from the Cable Labs, the governing body of the DOCSIS specification. In the interim, suggest using the value of 2 for the type field.

EXAMPLE

As noted above, TCP ACK messages in TCP clients are typically transmitted with the "delayed acknowledgment" algorithm, as suggested in RFC 1122. When this algorithm is running in a client, a number of the TCP ACK messages generated by that client are generated precisely because of the firing of the TCP ACK timer. As set forth above, a CMTS can attempting to deliver an unsolicited grant to the cable modem very shortly after the arrival of these timer-derived TCP ACKs. In order to do this, the CMTS needs to know when the timer ACKs arrive at the cable modem, as well as how long it takes to deliver the MAP containing the grant to the cable modem in the downstream direction.

For a simple, example method, the CMTS and the cable modem implement an extended header feature for the DOCSIS MAC packet header. FIG. 8 shows an unencrypted DOCSIS packet structure; FIG. 9 shows the packet with the extended header 200. The extended header feature is a way for the cable modem to mark every upstream packet with a time stamp indicating the time at which that packet arrived at the cable modem. The time stamp is preferably in synchronism with the DOCSIS system clock tick, as noted above. When the extended header is implemented, the CMTS knows exactly when each of the packets that the cable modem is transmitting upstream had originally arrived at the cable modem from the originating host. It would then be trivial for the CMTS to filter these packets and collect the TCP ACKs. The CMTS could identify IP packets by the Type/Len field of the Ethernet header, then among those, it could identify TCP packets by the protocol field of the IP header, then among those it could identify the ACKs by noting the presence of a '1' in the 1 bit wide acknowledgment field of the TCP header. The CMTS could then put the cable modem-stamped arrival times of these packets into separate "ACK buckets" sorted by their source IP address fields (MAC addresses would work OK as well, as long as it is known that all the cable modems are bridges). For a more robust implementation, the buckets would not only be defined by the IP address, but rather an IP address and TCP port number pair. At the end of this, or a similar process, each bucket would contain the arrival times of TCP ACKs coming from one source. The CMTS would then need to find out which of these ACKs were transmitted when the ACK timer fired at the host.

As noted above, the ACK timer is run as a kernel timer, and therefore is periodic in real time. The most common implementations use a 100 or 200 millisecond timer. We suggest that the CMTS collect a configurable number of ACKs into an ACK bucket (we suggest starting with 100, or for a more robust implementation, we suggest storing for a period of time, rather than a number of ACKs). The CMTS then performs modula arithmetic on these arrival times with a number of divisors, starting with 100, then 200, then 50, then 150 etc. The list of divisors to use should be configurable as well. The CMTS compares the results, and finds the interval or number which are identical or are within a configurable tolerance from each other, this we will name the "repeating" number. When the CMTS finds the repeating number among the results, it will be known that the ACK timer at that host is firing slightly before the times that were stored as the arrival times which yielded the repeating number after the modula operation.

The second number needed is how long it takes for a bandwidth allocation map packet (MAP) to arrive at the cable modem after the CMTS creates it. This is in fact a trivial number to calculate. This number is composed of two parts. The first part is the CMTS latency. In other words, after some task creates the MAP, some time will pass before the MAP is transmitted physically onto the wire. This number changes with each implementation, and in some implementations the number may change as system load and network load varies. However, it is critical for the CMTS to always know this number, in any event for general operations anyway, since the CMTS must deliver every MAP such that the Allocation Start Time of the MAP is still beyond the current time when the MAP arrives at the cable modem. As such, this is a known number in the CMTS. The second part is the time taken at the physical layer, between the actual transmission of the MAP onto the medium, and the reception of it by the cable modem. This number is also always known at the CMTS, as it must be taken into account when the Allocation Start Time is being calculated during the creation of the MAP. This number is taken from a table, and varies depending on the modulation and interleaver schemes being used at that specific CMTS, at that time.

Summarizing, the CMTS should collect the arrival times, should perform modula arithmetic on the arrival times as described above, and should find the "repeating number" as described above. This number, plus a multiple of the divisor that produced this number, then becomes the basic target for when the MAPs should arrive at the cable modem. The CMTS should then subtract from this number the system latency and the physical layer latency, and should then transmit the MAPs such that the grants should arrive at the cable modem slightly after this target time.

As a hypothetical example, let us assume that a series of TCP ACKs arrive at the cable modem at the following times:

1993754, 1993793, 1993836, 1993854, 1993927, 1994054, 1994138, 1994254, 1994354, 1994461

When we perform modula 100 on these numbers, we get the following results:

54, 93, 36, 54, 27, 54, 38, 54, 54, 61

We notice that 54 is the repeating number (as defined above), and conclude that the TCP timer is firing every 100 msec at (1993754+100n) where n is an integer. We then calculate that the system latency is 3 milliseconds, and we look up in the physical layer latency table that our system is running at 64QAM with 128,1 interleaver, resulting in 4 milliseconds of wire propagation. Therefore, we decide to transmit an unsolicited grant to the modem every (1993754+100n−7 ms). The grant therefore arrives simultaneous with the TCP ACK from the end station.

Next, we keep track of the grant usage by the cable modem, and if we note that the cable modem is not using any of these grants, we send the grants a configurable amount of time earlier. If we notice that the grants are still not used, we send them the same configurable amount of time later. We repeat this process by increasing the configurable amount by another configurable amount. When we find the adjustment which results in a large majority of the grants being used by the cable modem, we continue with the grants for a configurable amount of time, in order to allow TCP to stabilize around this change.

Next, we start sending more grants, evenly distributed between (1993754+100n−7 ms) and (1993754+100(n+1)−7 ms)). We may first send one grant, exactly in the middle of those two times, then we may split the interval into three evenly spaced parts and so on, depending on usage. Again, we keep track of the grant usage by the cable modem and we may increase or decrease the "in-between" grants, as cable modem usage indicates.

Thus, from the preceding discussion it will be appreciated that we have provided background information to familiarize the reader with the DOCSIS standard and the TCP protocol. We then described the effects of slow upstream links on TCP performance and demonstrated the asymmetric nature of DOCSIS systems. We have suggested several methods to overcome TCP performance problems in DOCSIS systems arising as a result of slow upstream links. We summarize them below:

1.) The CMTS detects the frequency of ACK timer firings and matches them with unsolicited grants.

2.) The CMTS transmits unsolicited grants not only to match the firing of the ACK timer but also to periodically provide grants for ACKs that may arrive at the cable modem may already be waiting at the cable modem between the firings of the ACK timer.

3.) The CMTS monitors the TCP traffic and follows every other TCP data packet with a matching unsolicited grant to the cable modem.

4.) As an alternative, the cable modem implements (1), (2), (3) or a combination of these methods, where the cable modem predicts bandwidth requirements for the transmission of the ACK packets on the upstream and requests bandwidth from the CMTS, prior to the arrival of the ACKs at the cable modem, through the use of requests messages or via the piggybacking method.

5.) As an alternative, the CMTS implements (1), (2), (3) or a combination of these methods using Unicast Request Regions instead of Unsolicited Grants.

6.) As a highly recommended enhancement, the cable modem and the CMTS set up a high priority service class for the transmission of ACKs on the upstream.

7.) The CMTS adjusts the unsolicited grant service in response to whether the modem is utilizing all of the grants or unsolicited request regions offered.

Real-Time Adjustment of the Nominal Grant Interval Boundary in UGS and UGS-AD Scheduling Services in DOCSIS Systems The concepts of communication of packet arrival time (or latency) have other applications, besides the file transfer example and elimination of buildup of TCP ACKs as set forth above. One other example is voice, and specifically Voice over Internet Protocol traffic from a cable modem connected to a VoIP application to a CMTS. In this situation it is also desireable to either eliminate or reduce latency at the cable modem as much as possible. The teachings above can be applied directly to voice packets. As another alternative, the timing of the grants of bandwidth can be shifted in time to match up with the arrival of voice packets from a G.711 voice CODEC. This latter embodiment will now be described.

Figure 10:
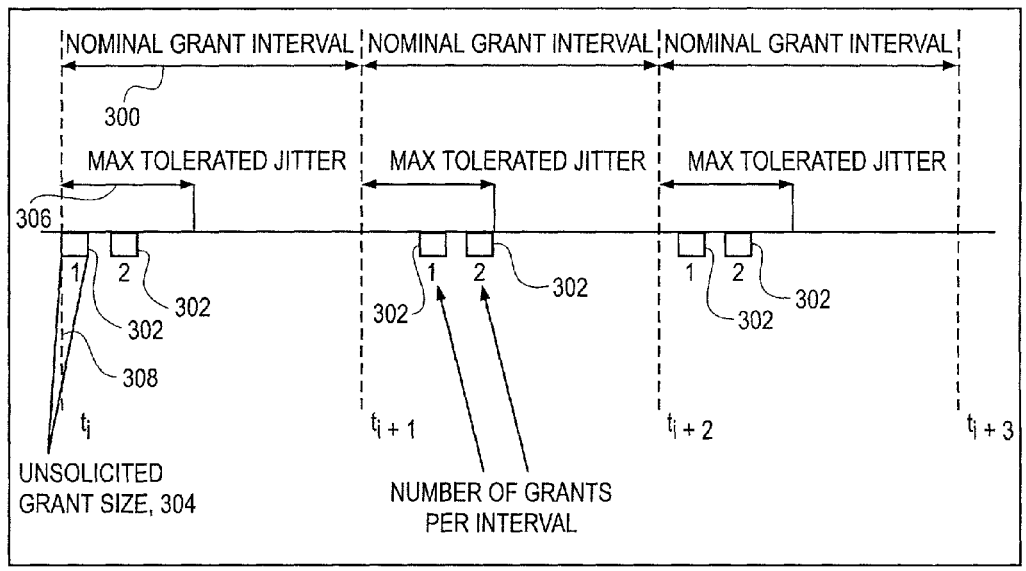
FIG. 10 is a diagram illustrating a nominal grant interval, and 2 unsolicited grants of bandwidth transmitted within the grant interval within a maximum tolerated period of jitter.

The DOCSIS standard defines an Upstream Scheduling Service type called the "Unsolicited Grant Service" (UGS) which can be used to map constant bitrate traffic onto DOCSIS upstream service flows. The Unsolicited Grant Service is defined by the "Nominal Grant Interval", "Unsolicited Grant Size", "Tolerated Grant Jitter" and "Grants per Interval" attributes. These attributes are depicted in the diagram of FIG. 10. With these attributes, the CMTS starts the service and delivers "Grants per Interval" number of data grants 302 (two in FIG. 10) of size "Unsolicited Grant Size" 304 within a "Tolerated Grant Jitter" time offset 306 from a point in time or boundary 308 which is an absolute multiple of the "Nominal Grant Interval" 300 time, forward from the time at which the service was started.

Figure 11:
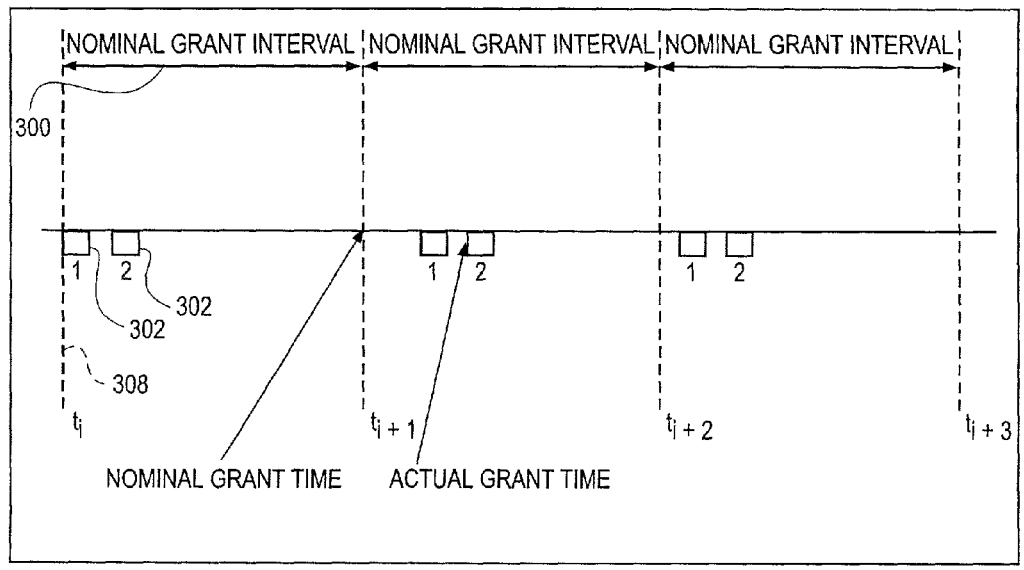
FIG. 11 is another diagram like FIG. 10 illustrating grants of bandwidth within a nominal grant interval, showing the terms nominal grant time and actual grant time.
Figure 12:
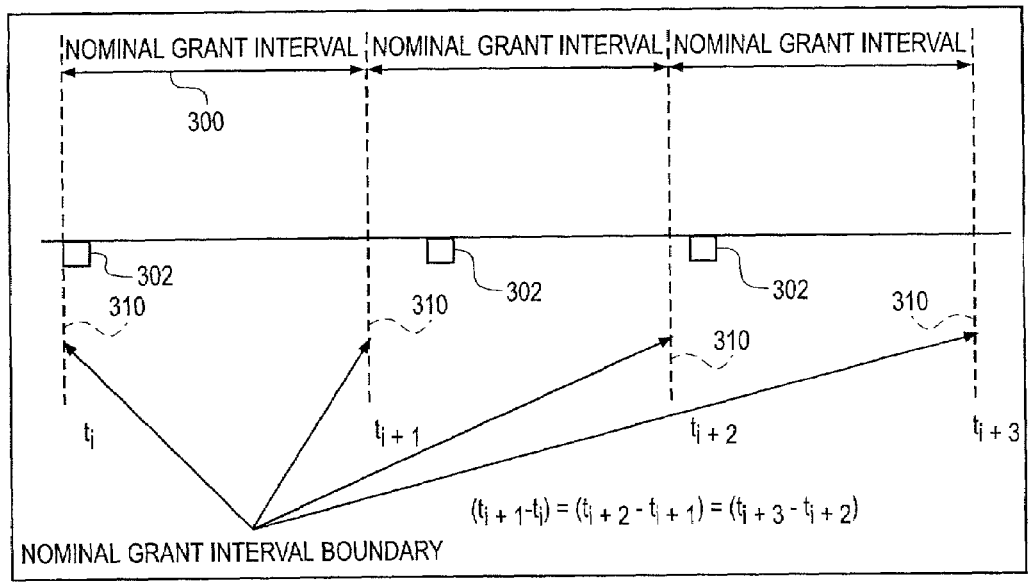
FIG. 12 is a diagram showing the nominal grant interval boundary separating nominal grant intervals.

The Nominal Grant Interval attribute 300 is absolute with reference to the start of the service. Jitter 306 is not measured with respect to the time difference between two consecutive grants 302 but rather with respect to the time difference between the "Nominal Grant Time" and the "Actual Grant Time". Note that in the case of multiple grants per interval, actual grant time is defined as the actual time of the last grant 302A in the interval. These two values are depicted in FIG. 11. The beginning of the Nominal Grant Interval is called the "Nominal Grant Interval Boundary" (NGI Boundary) 310, which is shown in FIG. 12. As defined by the DOCSIS standard, the position of this boundary 310 depends solely on the time that the CMTS starts the service and once the service has started, the boundary cannot be moved. The DOCSIS specification states that "The boundary of the Nominal Grant Interval is arbitrary and is not communicated between the CMTS and the CM" (SP-RFI).

We have discovered that it would be advantageous to be able to adjust the position of the NGI Boundary 310 in real-time, and in one aspect of the present invention we provide methods to accomplish this task.

Problems with a Fixed Nominal Grant Interval Boundary

The CMTS uses Unsolicited Grant Services (UGS) in order to create a Constant Bit Rate (CBR) service flow between the CMTS and the CM. CBR is necessitated when the source of the data flow is a real time application which generates fixed size packets at fixed intervals, with a very low tolerance for jitter. Example of such applications would be real-time video or audio streaming, or Voice-over-IP (VoIP) phone calls. The application that is generating the data flow may be running on a device attached to the Cable Modem (CM) or it could be an application which is embedded in the Cable Modem itself. If the cable modem incorporates the real-time application, such as an embedded MTA device, there will still be a component in the CM which is handed the real time application's packets and which must process the CMTS' data grants in order to transmit those packets upstream.

Figure 13:
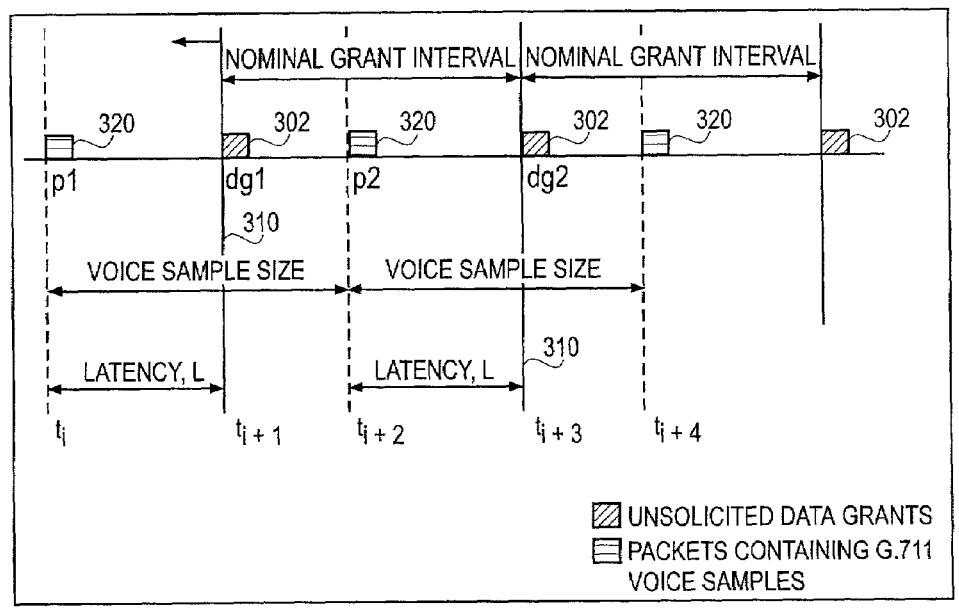
FIG. 13 is an illustration of the arrival of unsolicited data grants and voice packets at the cable modem, showing an unsolicited grant service with a nominal grant interval equal to the sample size of a voice coder/decoder (CODEC). However, the nominal grant interval boundary is not lined up with the sample time of the CODEC, thereby introducing latency in the delivery of voice packets in the upstream direction to the cable modem termination system.

We will take for an example, a VoIP application running on a network entity, directly connected to a CM. For this example, we will consider a VoIP application which is using the G.711 codec, setup to transmit one voice packet every 20 miliseconds (ms). In such a setup, during registration, the CM would request unsolicited grant service (UGS), with a 20 ms grant interval from the CMTS. The CM may request such a service to be started immediately or it may request that the service be admitted only, to be started later with a Dynamic Service request. At the point that the service starts, the CMTS would, every 20 ms, grant the modem a data grant of the size requested by the modem during the initial setup. Assuming negligible jitter in the system, the grants would be activated 20 ms apart. When the VoIP application starts generating the voice packets, again assuming negligible jitter, the voice packets will arrive at the CM once every 20 ms. Thus, every time the CM receives a voice packet from the VoIP application, it will receive a data grant from the CMTS. However, there is currently no mechanism to synchronize the activation of the data grants and the arrival of the voice packets. Therefore, it is perfectly valid and within the specification, if the data grant is activated a full 19 ms after the arrival of the voice packet. In that case, the voice packet will have to wait at the CM for the 19 ms, before it can be transmitted upstream. The situation where the timing of the grants of bandwidth are out of synch with the arrival of the voice packets from the G.711 CODEC is shown in FIG. 13.

Figure 14:
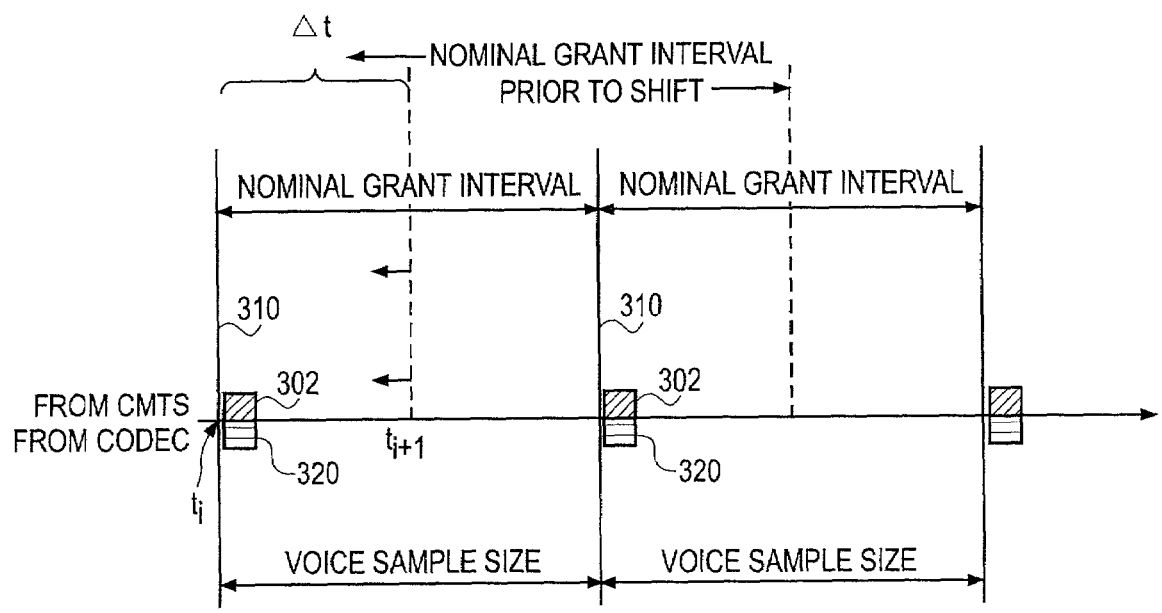
FIG. 14 is an illustration showing the shifting or adjusting of the nominal grant interval boundaries so as to time the arrival of the grants of bandwidth with the arrival of the packets containing the voice samples at the cable modem, in accordance with one embodiment of the present invention.

In accordance with one aspect of the invention, we have appreciated that overall system latency can be improved by providing a mechanism to synchronize the activation of the data grants and the arrival of the voice packets (or any other real time, periodic data stream) at the CM, such that the data grant is activated and arrives at the cable modem simultaneous with or immediately after the arrival of the voice packet or any other real time, periodic data stream. This is illustrated in FIG. 14. To achieve this result, the nominal grant interval boundary 310 is shifted to the left by an amount ΔT, equal to latency between the arrival of the bandwidth grant and the arrival of the voice packet in FIG. 13.

Thus, while we have described previously one implementation of the invention in the context of TCP ACK packets in a file transfer session, the invention is applicable to other situations as well. In particular, the invention is applicable to any situation where synchronization of the activation or arrival of data grants with the arrival of data packets at a cable modem where latency is a concern, such as, for example, VoIP, video conferencing, or any other real time periodic data stream.

As noted previously, one method of achieving this objective is to time stamp packet arrival times at the cable modem and determine latency on the transmission path to time the activation of data grants such that they arrive at the cable modem simultaneous with or shortly after arrival of the next packet at the cable modem. Alternatively, the latency can be determined by forwarding reports from the cable modem to the CMTS with the latency for one packet (or an average latency for a group of packets), or by maintaining a object in the cable modem that contains this information but which is accessible to the CMTS. This system works well with packets that are arriving a regular periodic intervals. In some situations, such as VoIP, a shifting of the Nominal Grant Interval Boundary can substantially reduce latency and improve the quality of the connection.

A Method to Adjust the Nominal Grant Interval Boundary in Real-Time

One example of adjustment of the nominal grant interval will now be described in conjunction with FIGS. 13 and 14.

FIG. 13 depicts the arrival times of a stream of voice packets and the activation of a stream of data grants at the CM. It can be observed that the voice packets 320 containing voice samples from a G.711 CODEC arrive at the CM at $t_i$ and $t_{i+2}$ whereas the data grants are activated at $t_{i+1}$ and $t_{i+3}$. Since the interval between the voice packets is constant in the present example, we conclude that the application creating them, in this case a G.711 voice CODEC, is working perfectly. The same can be concluded about the data grants 302 as well, since the data grants 302 are activated perfectly lined up at the nominal grant interval boundaries 310. The data packets, however, have to wait at the CM for a latency period of L equal to the difference between $t_{i+1}$ and $t_i$, or $t_{i+3}$ and $t_{i+2}$. We can reduce or eliminate this latency, by moving or shifting the arrival time boundaries of the data packets or the activation time of the data grants. Since moving the arrival boundaries of the data packets involve adjusting the workings of potentially many different network entities running distinct CODECS by many different vendors, a more efficient method is to adjust the data grant boundaries. This is shown in FIG. 14.

At the cable modem, or in the case of an embedded MTA, at the component of the cable modem which handles upstream transmission, we prefer to embed suitable software, readily developed by a person skilled in the art from the present disclosure, which relays additional information to the CMTS such that the CMTS could infer the latency L and could move the nominal grant interval boundary so as to reduce or eliminate this extra latency. This can be accomplished by relaying some extra information to the CMTS indicating either the arrival times at the CM of the voice packets, or relaying directly the value of L. We suggest several methods each of accomplishing either of these tasks:

1) Appending extra fields to the upstream data packets sent from the cable modem to the CMTPS which contain a time stamp indicating the arrival time of the voice packets at the cable modem. This technique is described previously in this document.

2) Appending extra fields to the upstream data packets which indicate the value of the latency L for a voice packet.
3) Creating periodic reports which indicate the arrival times of a number of data packets at the cable modem, and forwarding the reports to the CMTS.
4) Creating periodic reports which indicate the value of L for a set of packets to the CMTS.
5) Storing the average value of latency L in a managed object at the cable modem. One possibility is storing the value of L as a Simple Network Management Protocol MIB variable and the CMTS could read this value from the cable modem periodically. In this case we suggest that the values could be kept in a table, indexed by the Service ID of the traffic flow which is receiving the unsolicited grant service.

Handling Multiple Grants per Interval

It is possible for UGS to be setup with multiple grants per interval. In such a setup, several traffic flows are mapped to a single UGS. The individual flows are referred to as "subflows". In this case, we define the value of latency, L, at the CM, to be the difference between the arrival of the first data packet from any of the subflows and the activation time of the first data grant of the multiple data grants granted per interval. The principles described above are directly applicable to multiple grants per interval.

From the foregoing it will be appreciated that we have described how additional latency is incurred by each packet, in a real-time application, when the Nominal Grant Interval Boundary and the boundary at which the data arrives at the CM are not synchronized well. We then suggested that the CMTS can better synchronize these two boundaries if it has knowledge of the time-difference between the two boundaries. This knowledge can be calculated or inferred if the CM could relay some additional knowledge to the CMTS, either in the form of the arrival times of the data packets, or in the form of a direct calculation of the difference between the two boundaries. We finally described several methods that this information can be relayed to the CMTS. The CMTS then shifts or adjusts the boundary to synchronize the arrival of the bandwidth grant and the arrival of the data packet at the cable modem.

While presently preferred embodiments of the invention have been described with particularly, persons skilled in the art will appreciate that variation from the specifics of the preferred embodiment are possible without departure from the spirit and scope of the invention. This scope of the invention is to be determined by reference to the appended claims, interpreted in view of the foregoing description.

The invention claimed is:

1. A method of reducing latency in a data-over-cable system having a cable modem termination system and a cable modem in communication with each other over a cable network, comprising the steps of:
   (a) transmitting data associated with packet arrival times from a cable modem to a cable modem termination system; and
   (b) transmitting from said cable modem termination system grants of bandwidth in an upstream direction to said cable modem at intervals derived from said data in step (a), wherein said grants of bandwidth are timed to arrive simultaneously with or shortly after arrival of additional packets at said cable modem for transmission to said cable modem termination system;
   wherein said data in step (a) comprises a report indicating the arrival times of a number of packets at said cable modem for transmission to said cable modem termination system.

2. The method of claim 1, further comprising the step of (c) transmitting Transmission Control Protocol acknowledgment packets from said cable modem to said cable modem termination system in response to said grants of bandwidth.

3. The method of claim 1, wherein the data transmitted in step (a) further comprises a time stamp indicating the arrival time of a packet at said cable modem.

4. The method of claim 3, wherein said time stamp is synchronized with a DOCSIS system clock.

5. The method of claim 1, wherein said data transmitted in (a) is transmitted in an extended header in a DOCSIS MAC header.

6. A method of reducing latency in a data-over-cable system having a cable modem termination system and a cable modem in communication with each other over a cable network, comprising the steps of:
   (a) transmitting data associated with latency between grants of bandwidth and packet arrival times from a cable modem to a cable modem termination system; and
   (b) transmitting from said cable modem termination system grants of bandwidth in an upstream direction to said cable modem at intervals derived from said data in step (a), wherein said grants of bandwidth are timed to arrive simultaneously with or shortly after arrival of additional packets at said cable modem for transmission to said cable modem termination system;
   wherein said data in step (a) comprises a report indicating the amount of latency for at least one packet arriving at said cable modem for transmission to said cable modem termination system.

7. The method of claim 6, further comprising the step of (c) transmitting Transmission Control Protocol acknowledgment packets from said cable modem to said cable modem termination system in response to said grants of bandwidth.

8. The method of claim 6, wherein said data transmitted in (a) is transmitted in an extended header in a DOCSIS MAC header.

9. A method of reducing latency in a data-over-cable system having a cable modem termination system and a cable modem in communication with each other over a cable network, comprising the steps of:
   (a) transmitting data associated with either (i) packet arrival times or (ii) latency between grants of bandwidth and packet arrival times from a cable modem to a cable modem termination system; and
   (b) transmitting from said cable modem termination system grants of bandwidth in an upstream direction to said cable modem at intervals derived from said data in step (a), wherein said grants of bandwidth are timed to arrive simultaneously with or shortly after arrival of additional packets at said cable modem for transmission to said cable modem termination system:
   wherein said data in step (a) is stored in a managed object at the cable modem and accessed by said cable modem termination system.

10. In a data-over-cable system, a method for minimizing accumulation of TCP ACK packets at a cable modem, comprising the steps of:
   a) said cable modem time stamping the arrival of TCP ACK packets from an end station connected to said cable modem;

b) transmitting one or more packets from said cable modem to a cable modem termination system containing data associated with a plurality of said time stamps;

c) said cable modem termination system obtaining from said time stamps a periodicity of TCP ACK packets arriving at said cable modem and responsively conducting a grant of bandwidth service for said cable modem based on said periodicity for transmission of said TCP ACK packets to said cable modem termination system.

11. The method of claim 10, wherein said data in step b) is transmitted in an extended header of a DOCSIS MAC header.

12. The method of claim 10, wherein said time stamp is made in accordance with a DOCSIS system clock.

13. In a data-over-cable system, a method for minimizing accumulation of TCP ACK packets at a cable modem, comprising the steps of:

a) said cable modem time determining the latency between the arrival of TCP ACK packets from an end station connected to said cable modem and grants of bandwidth from a cable modem termination system;

b) transmitting one or more packets from said cable modem to a cable modem termination system containing data associated with said determination of latency; and c) said cable modem termination system responsively conducting a grant of bandwidth service for said cable modem based on said latency for transmission of said TCP ACK packets to said cable modem termination system.

14. In a cable modem having a memory, the improvement comprising:

software or hardware apparatus recording in said memory the latency between time of arrival of packets at said cable modem from an end station connected to said cable modem and the grants of bandwidth for forwarding said packets to said cable modem termination system; and communications apparatus including software in said cable modem either forwarding or making available to said cable modem termination system data associated with said latency.

15. The improvement of claim 14, wherein said packets comprise TCP acknowledgment packets.

16. The improvement of claim 14, wherein said packets comprise voice packets.

17. The improvement of claim 16, wherein said voice packets are coded by a G.711 CODEC.

18. In a cable modem termination system transmitting grants of bandwidth in an upstream direction to cable modems during a nominal grant interval boundary, the improvement comprising:

software responsive to information as to latency between arrival of packets at said cable modem and previous grants of bandwidth and responsively adjusting the timing of the nominal grant interval boundary to thereby time the arrival of grants of bandwidth so as to arrive simultaneous with or shortly after the arrival of packets at said cable modem from an end station connected to said cable modem.

19. The improvement of claim 18, wherein said packets comprise voice packets.

20. A method of decreasing latency in a Voice over Internet Protocol (VoIP) session between a cable modem and a cable modem termination system, said cable modem termination system periodically transmitting grants of bandwidth during a nominal grant interval having a boundary in time commencing said nominal grant interval, the method comprising the steps of:

a) determining the latency L between a nominal interval grant boundary and the arrival of a voice packet at said cable modem;

b) said cable modem termination system determining said latency L; and c) said cable modem termination system shifting said nominal interval grant boundary an amount equal to L.

21. The method of claim 20, wherein step b) comprises the step of transmitting data from said cable modem to said cable modem termination system identifying said latency L.

22. The method of claim 20, wherein step b) comprises the step of transmitting reports to said cable modem termination system indicating said latency L for a plurality of packets.

23. The method of claim 22, wherein step b) comprises maintaining a managed object at said cable modem storing information as to said latency and said cable modem termination system accessing said managed object.

24. The method of claim 20, wherein step b) comprises forwarding packet arrival times to said cable modem termination system.

* * * * *